(12) United States Patent
Abedini et al.

(10) Patent No.: US 11,690,071 B2
(45) Date of Patent: Jun. 27, 2023

(54) SYSTEM AND METHOD FOR SIGNALING CONTROL INFORMATION WITH A RELAY DEVICE

(71) Applicant: QUALCOMM Incorporated, San Diego, CA (US)

(72) Inventors: Navid Abedini, Somerset, NJ (US); Junyi Li, Chester, NJ (US); Ashwin Sampath, Skillman, NJ (US)

(73) Assignee: QUALCOMM Incorporated, San Diego, CA (US)

(*) Notice: Subject to any disclaimer, the term of this patent is extended or adjusted under 35 U.S.C. 154(b) by 25 days.

(21) Appl. No.: 17/021,525

(22) Filed: Sep. 15, 2020

(65) Prior Publication Data
US 2021/0127368 A1  Apr. 29, 2021

Related U.S. Application Data

(60) Provisional application No. 62/926,356, filed on Oct. 25, 2019.

(51) Int. Cl.
*H04W 72/04* (2023.01)
*H04B 7/155* (2006.01)
(Continued)

(52) U.S. Cl.
CPC ........ *H04W 72/23* (2023.01); *H04B 7/15528* (2013.01); *H04L 5/0055* (2013.01); *H04W 72/044* (2013.01)

(58) Field of Classification Search
CPC .............. H04W 72/042; H04W 72/044; H04L 5/0055; H04B 7/15528
See application file for complete search history.

(56) References Cited

U.S. PATENT DOCUMENTS 9,420,577 B2 * 8/2016 Kim ..................... H04W 72/27
2011/0122807 A1 * 5/2011 Onodera ................. H04L 25/24
370/315
(Continued)

OTHER PUBLICATIONS

Huawei, et al., "Evaluation on the Dynamic and Flexible Resource Allocation in IAB", 3GPP TSG-RAN WG1 Meeting #92bis, 3GPP Draft; R1-1804303, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), 7 Pages, XP051426591, Retrieved from the Internet: URL: http://www.3gpp.org/ftp/Meetings%5F3GPP%5FSYNC/RAN1/Docs/ [retrieved on Apr. 15, 2018] Sections 1 and 2.

(Continued)

*Primary Examiner* — Rasheed Gidado
(74) *Attorney, Agent, or Firm* — ArentFox Schiff LLP

(57) ABSTRACT

An apparatus may configure a first set of resources associated with first control information for a relay device. The apparatus may configure a second set of resources associated with at least one of data or second control information for at least one UE, and the second set of resources may at least partially overlap with the first set of resources. The apparatus may transmit information indicating the first set of resources and the second set of resources to the relay device. Further, the apparatus may communicate, with the relay device, the first control information on the first set of resources and the at least one of data or second control information on the second set of resources, and the relay device may be configured to relay the at least one of data or second control information between the apparatus and the at least one UE.

27 Claims, 10 Drawing Sheets

(51) Int. Cl.
  *H04L 5/00* (2006.01)
  *H04W 72/23* (2023.01)
  *H04W 72/044* (2023.01)

(56) References Cited

U.S. PATENT DOCUMENTS

| | | | | |
|---|---|---|---|---|
| 2011/0165871 | A1* | 7/2011 | Juergen | H04W 16/26 455/424 |
| 2012/0069790 | A1* | 3/2012 | Chung | H04L 5/0094 370/329 |
| 2012/0113884 | A1* | 5/2012 | Park | H04L 5/0032 370/312 |
| 2014/0133387 | A1* | 5/2014 | Wagner | H04L 5/003 370/315 |
| 2014/0171094 | A1* | 6/2014 | Noh | H04W 40/22 455/452.1 |
| 2017/0303282 | A1* | 10/2017 | Lee | H04B 7/15542 |
| 2018/0132255 | A1* | 5/2018 | Hessler | H04W 72/10 |
| 2020/0029353 | A1* | 1/2020 | Xu | H04W 52/0209 |
| 2020/0374857 | A1* | 11/2020 | Zeng | H04W 68/005 |

OTHER PUBLICATIONS

International Search Report and Written Opinion—PCT/US2020/051112—ISA/EPO—dated Nov. 17, 2020.
QUALCOMM Incorporated: "Enhancements to Support NR Backhaul Links", 3GPP TSG RAN WG1 Meeting #94b, R1-1811256, Chengdu, China, Oct. 8-Oct. 12, 2018, Oct. 12, 2018 (Oct. 12, 2018) the Whole Document, 22 Pages, XP051518659, Retrieved from the Internet: URL: http://www.3gpp.org/ftp/tsg%5Fran/WG1%5FRL1/TSGR1%5F94b/Docs/R1%2D1811256%2Ezip. [retrieved on Sep. 29, 2018] figures 1-9 tables 1-6 sections 1 - 3.
QUALCOMM Incorporated: "Resource Management in IAB Network," 3GPP Draft, 3GPP TSG RAN WG1 Meeting #94bis, R1-1811258, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518661, 8 pages, Retrieved from the Internet: URL: http://www.3gpp.org/ftp/tsg%5Fran/WG1%5FRL1/TSGR1%5F94b/Docs/R1%2D1811258%2Ezip [retrieved on Sep. 29, 2018] Figures 1-5, Sections 2-3, Chapter 2.1 "Indication of Resource Partition Pattern", 2.2 Interaction between Resource Partition Pattern and Rel15 Resource Allocation, pp. 5-7, Chapter 2.3 "Dynamic Coordination with Extended SFI and UL Feedback", Chapter 3 "Conclusion".

* cited by examiner

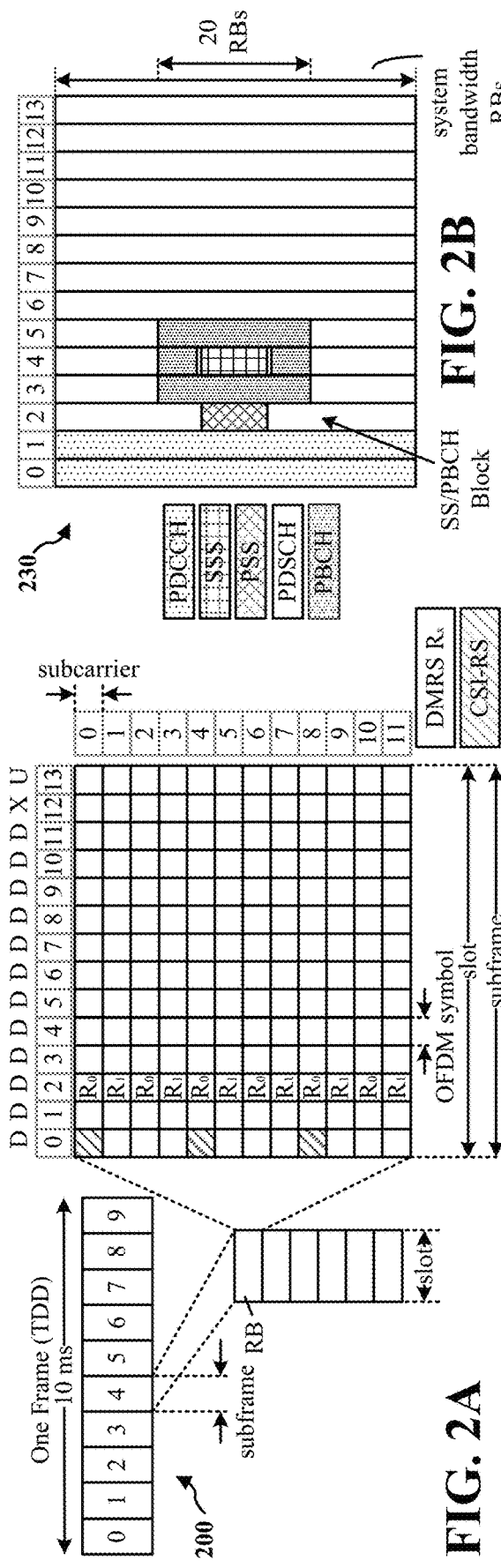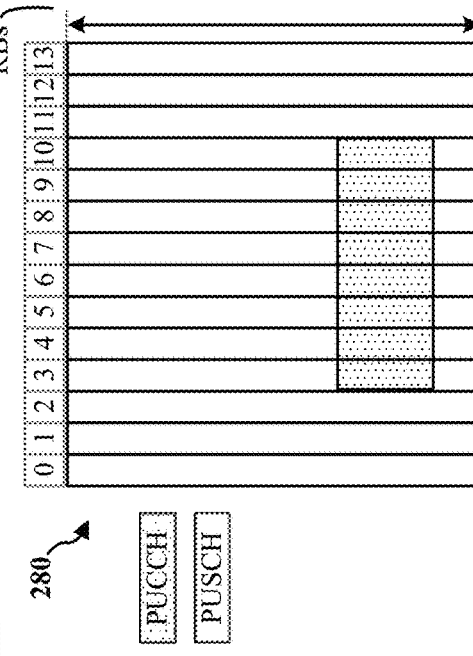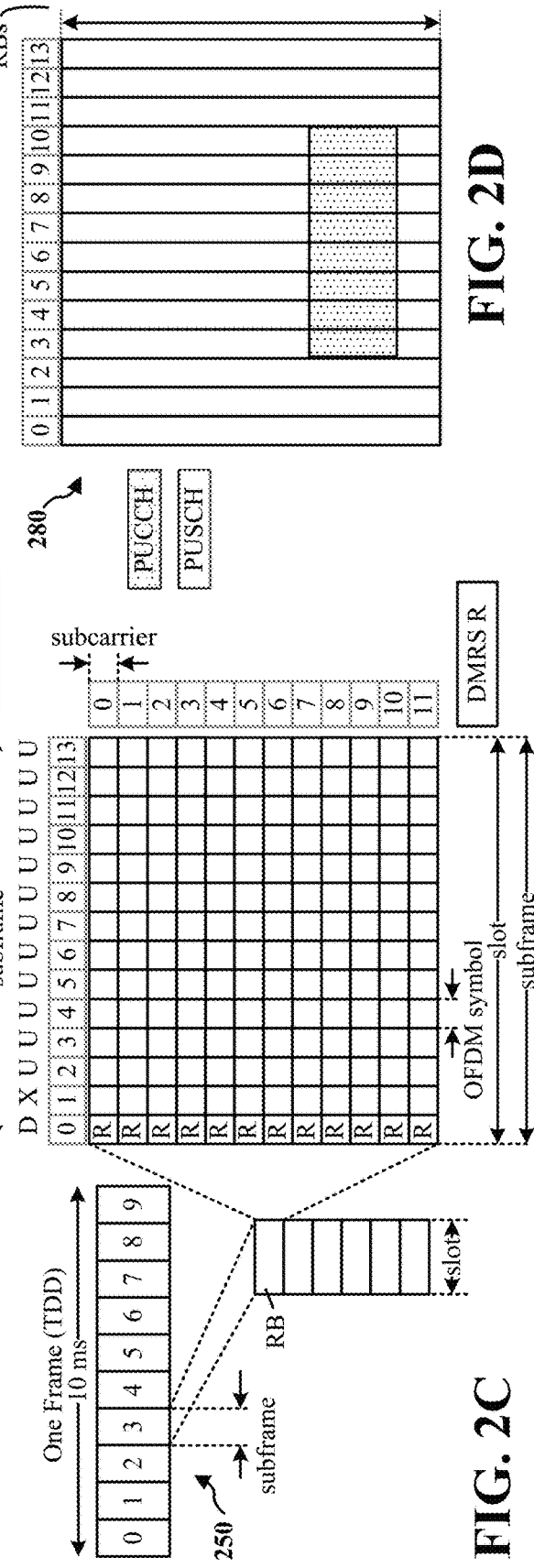

SYSTEM AND METHOD FOR SIGNALING CONTROL INFORMATION WITH A RELAY DEVICE

CROSS REFERENCE TO RELATED APPLICATION(S)

This application claims the benefit of U.S. Provisional Application Ser. No. 62/926,356, entitled "SYSTEM AND METHOD FOR SIGNALLING CONTROL INFORMATION WITH RELAY DEVICE" and filed on Oct. 25, 2019, the disclosure of which is expressly incorporated by reference herein in its entirety.

BACKGROUND

Technical Field

The present disclosure relates generally to communications systems, and more particularly, to a relay device configured to communicate control signaling with a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some wireless communications systems, many relay devices may be deployed to improve and/or extend the coverage of base stations (e.g., gNBs, macro base stations, etc.) for millimeter wave (mmW) and/or near-mmW radio access networks (RANs). An example of such a relay device may be an Internet Access and Backhaul (IAB) node, which may be configured to implement a truncated version a radio protocol stack for relaying operations (although a full version of a radio protocol stack may be implemented for other operations, such as backhaul communication). For example, some IAB nodes may implement Layer 1 (L1) functionality for relay operations but not Layer 2 (L2) and Layer 3 (L3) functionalities. Such IAB nodes may relay analog signals without conversion to the digital domain (e.g., at least in part because of the absence of L2 and L3 functionalities of a radio protocol stack associated with relaying operations). Implementation of a truncated version of a radio protocol stack for relaying operations may reduce cost, complexity, and/or power consumption overheads incurred by deployment and/or operation of various relay devices, including IAB nodes.

Due at least in part to the reduced cost, complexity, and/or power consumption overheads, deployment of many IAB nodes may be possible, but connecting each of the many IAB nodes to a core network through a base station using wired backhaul may be infeasible. Therefore, IAB nodes may be configured for wireless backhaul, potentially with multiple hops between the base station and some IAB nodes.

With wireless backhaul, each of the IAB nodes may be wirelessly connected with the core network through the base station. However, wireless backhaul links may be configured on the same resources as wireless access links between the base station and a set of user equipment (UE). For example, wireless backhaul links between a base station and a set of IAB nodes may share the same radio access technology (RAT) and, therefore, may share the same frequency band(s) and timing structure(s) (e.g., symbols, slots, etc.) as the wireless access links between the base station and the set of UEs. Illustratively, 5G NR RATs may define Frequency Range (FR) 2 as frequency bands from approximately 24.25 gigahertz (GHz) to approximately 52.6 GHz, on which both wireless backhaul links and wireless access links may be configured. Consequently, resources configured to carry control signaling via a control interface on a backhaul link for an IAB node may, in some instances, at least partially overlap with resources configured to carry relay signaling on an access link for a UE through the IAB node.

As the backhaul and access links may share resources on which a base station communicates with a relay device, multiplexing control signaling on the backhaul link with relay signaling on the access link may be unavoidable. The present disclosure may provide various techniques and approaches for communicating control signaling on a backhaul link and relay signaling on an access link when the backhaul link and the access link are configured on a set of overlapping resources.

In some aspects of the present disclosure, control signaling configured to be carried on a set of resources that at least partially overlaps with a set of resources configured to carry relay signaling on an access link may be multiplexed according to at least one of space-division multiplexing (SDM), frequency-division multiplexing (FDM), and/or time-division multiplexing (TDM). In some other aspects of the present disclosure, one of control signaling or relay signaling may be prioritized over the other one of control signaling and relay signaling when the control signaling and the relay signaling are configured to be carried on a set of overlapping resources. A base station may determine which of the at least one of SDM, FDM, and/or TDM is to be applied when multiplexing control signaling and relay signaling and/or may determine prioritization of control signaling relative to relay signaling when a backhaul link configured to carry control signaling and an access link configured to carry relay signaling are configured on overlapping resources.

In an aspect of the disclosure, a first method, a first computer-readable medium, and a first apparatus are provided. The first apparatus may be implemented as a base station. The first apparatus may configure a first set of resources associated with first control information for a relay device. The first apparatus may configure a second set of resources associated with at least one of data or second control information for at least one UE, and the second set of resources may at least partially overlap with the first set of resources. The first apparatus may transmit information indicating the first set of resources and the second set of resources to the relay device. Further, the first apparatus may communicate, with the relay device, the first control information on the first set of resources and the at least one of data or second control information on the second set of resources, and the at least one of the data or second control information may be further communicated with the at least one UE via the relay device.

In another aspect of the disclosure, a second method, a second computer-readable medium, and a second apparatus are provided. The second apparatus may be implemented as a relay device, such as an IAB node or other repeater. The second apparatus may receive, from a base station, information indicating a first set of resources associated with first control information for a relay device and indicating a second set of resources associated with at least one of data or second control information for at least one UE, and the second set of resources may at least partially overlap with the first set of resources. The second apparatus may communicate, with the base station, the first control information on the first set of resources and the at least one of data or second control information on the second set of resources. Further, the second apparatus may relay the at least one of data or second control information between the base station and the at least one UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
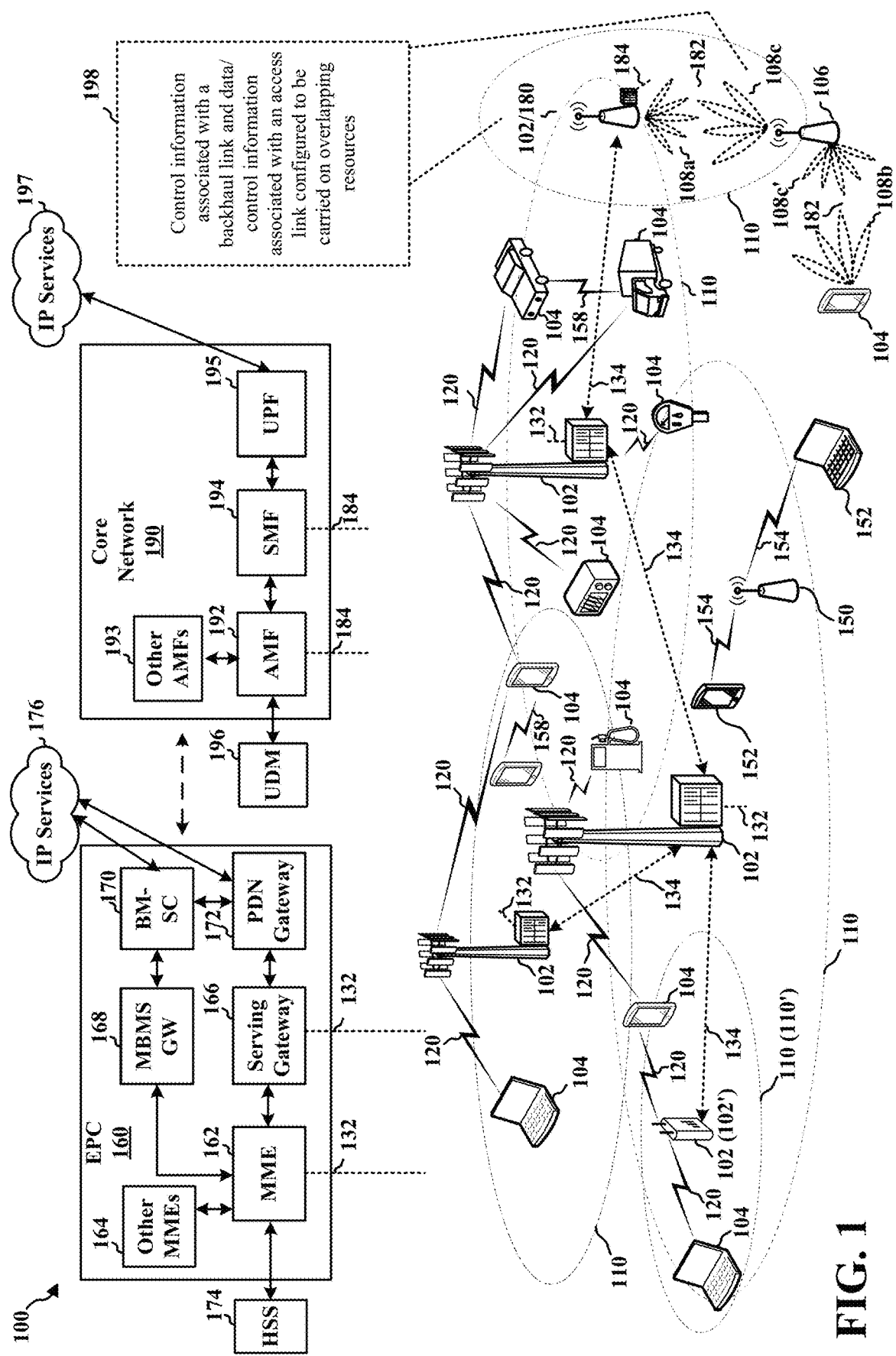
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the access network 100 may include at least one relay device 106, as described herein. A relay device 106 may be configured to forward relay signaling (e.g., data and/or control information) between the base station 102/180 and the UE 104 over an access link. Further, the relay device 106 may be configured to communicate control signaling (e.g., control information associated with the relay device 106 that is not forwarded between the base station 102/180 and the UE 104).

As the base station 102/180 and the relay device 106 may lack a wired connection for backhaul, the base station 102/180 may utilize beamforming 182 with the relay device 106 for both a wireless backhaul link between the base station 102/180 and the relay device 106 and a wireless access link between the base station 102/180 and the UE 104 through the relay device 106.

The base station 102/180 may transmit beamformed signals to the relay device 106 in one or more transmit directions 108*a*. The relay device 106 may receive the beamformed signal from the base station 102/180 in one or more receive directions 108*c*. The relay device 106 may also transmit beamformed signals to the base station 102/180 in one or more transmit directions. The base station 102/180 may receive the beamformed signals from the relay device 106 in one or more receive directions. Similarly, the relay device 106 may transmit beamformed signals to the UE 104 in one or more transmit directions 108*c'*. The UE 104 may receive the beamformed signals from the relay device 106 in one or more receive directions 108*b*. The UE 104 may also transmit beamformed signals to the relay device 106 in one or more transmit directions. The relay device 106 may receive the beamformed signals from the UE 104 in one or more receive directions.

The relay device 106 may perform beam training with the base station 102/180 and with the UE 104 to respectively determine the best receive and transmit directions with the base station 102/180 and with the UE 104. The transmit and receive directions for one or more of the base station 102/180, the relay device 106, and/or the UE 104 may or may not be the same.

The base station 102/180 may configure a first set of resources for control information associated with a backhaul link for the relay device 106 and configure a second set of resources for data/control information associated with an access link for the UE 104 through the relay device 106. The control information associated with the backhaul link and the data/control information associated with the access link may be configured by the base station 102/180 to be carried on overlapping resources. That is, the first set of resources and the second set of resources may be configured to at least partially overlap in at least one of time and/or frequency.

The base station 102/180 may transmit information indicating the configuration of the first set of resources and the second set of resources to the relay device 106. Accordingly, the relay device 106 may receive the information indicating the first set of resources for control information associated with the backhaul link and the second set of resources for data/control information associated with the access link. The base station 102/180 and the relay device 106 may communicate the control information associated with the backhaul link on the first set of resources and the data/control information associated with the access link on the second set of resources.

As the first and second sets of resources may be at least partially overlapping in time and/or frequency, the control information associated with the backhaul link on the first set of resources may be multiplexed with the data/control information associated with the access link on the second set of resources (198). In the various aspects described herein, the base station 102/180 may configure multiplexing of the control information associated with the backhaul link on the first set of resources and the data/control information associated with the access link on the second set of resources (198) according to at least one of frequency-division multiplexing, time-division multiplexing, and/or space-division multiplexing. The base station 102/180 may configure such multiplexing based on capabilities of the relay device 106, based on beamforming configurations of the relay device 106, and/or based on power control configurations of the relay device 106.

The relay device 106 may be the terminal point (in the downlink) or origination point (in the uplink) of control information on the backhaul link. However, the relay device 106 may be configured to forward data/control information communicated on the second set of resources between the base station 102/180 and the UE 104.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
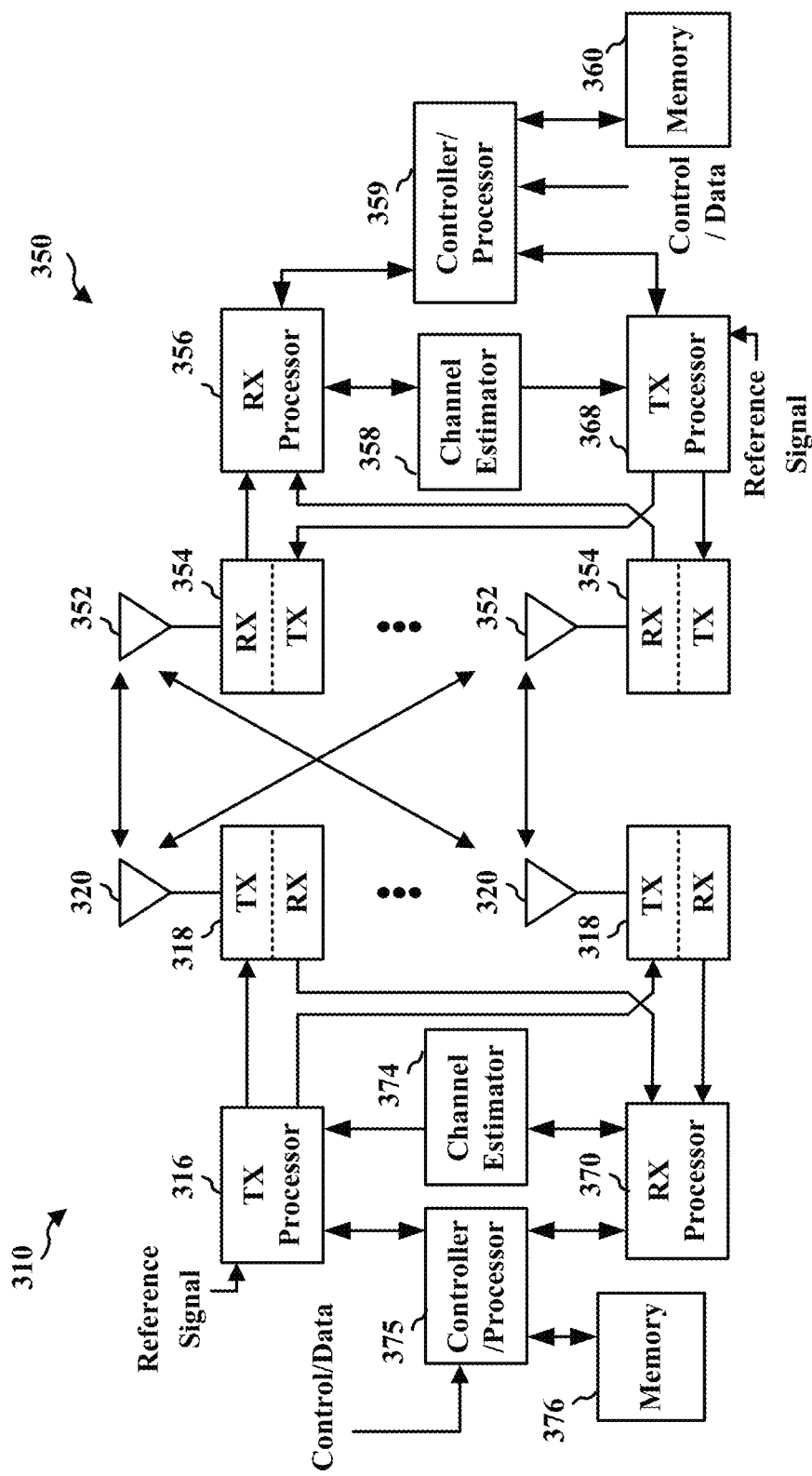
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 (L3) and layer 2 (L2) functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1 (L1), which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 316, the RX processor 370, and/or the controller/processor 375 of the base station 310 may be configured to perform aspects in connection with (198) of FIG. 1.

In some other aspects, a relay device, as described in the present disclosure, may include elements similar to those of the TX processor 368, the RX processor 356, and the controller/processor 359, at least one of which may be configured to perform aspects in connection with (198) of FIG. 1.

Figure 4:
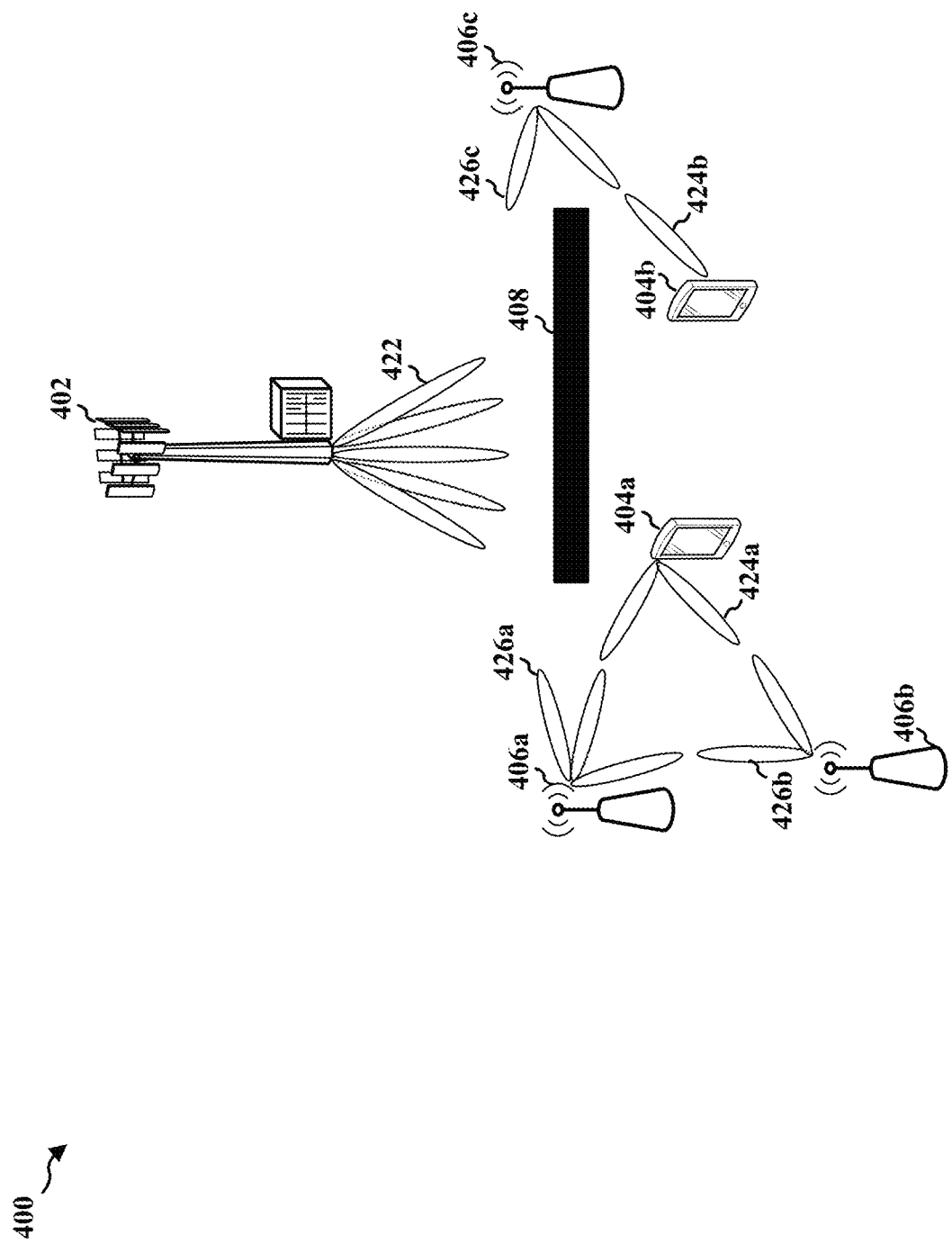
FIG. 4 is a diagram illustrating an example of a base station communicating with a set of UEs through a set of relay devices.

FIG. 4 is a diagram illustrating a wireless communications environment 400. The wireless communications environment 400 may include, inter alia, a base station 402, a set of relay devices 406a-c, and a set of UEs 404a-b. In the context of FIGS. 1 and 3, the base station 402 may be implemented as the base station 102/180 and/or the base station 310, each of the UEs 404a-b may be implemented as the UE 104 and/or the UE 350, and each of the relay devices 406a-c may be implemented as the relay device 106.

Each of the UEs 404a-b and each of the relay devices 406a-c may be configured to communicate with the base station 402 in a mmW and/or near-mmW RAN (e.g., a 5G NR RAN). Thus, the base station 402, the UEs 404a-b, and the relay devices 406a-c may utilize beamforming in order communicate. For beamformed communication, a beam pair link may be configured, e.g., by the base station 402. A beam pair link may include at least one TX beam configured at a transmitting side and at least one corresponding RX beam configured at a receiving side; therefore, signals may be transmitted by the transmitting side via the at least one TX beam and received by the receiving side via the at least one RX beam.

For example, at least one of the beams 426a-c of a respective one of the relay devices 406a-c and a corresponding at least one of the beams 422 of the base station 402 may be configured as a beam pair link, which may be configured for one or both of uplink communication and/or downlink communication. Similarly, at least one of the beams 424a-c of a respective one of the UEs 404a-c and a corresponding at least one of the beams 426a-c of a respective one of the relay devices 406a-c may be configured as a beam pair link, which may be configured for one or both of uplink communication and/or downlink communication to be forwarded to and/or from the base station 402.

However, the paths between each of the UEs 404a-b and the base station 402 may be obstructed by at least one blocker 408 (e.g., a human body, a wall, another structure through which high-frequency signals may not pass, etc.), which may prevent signals from traveling between the UEs 404a-b and the base station 402 as signals in the relatively high frequencies of mmW and near-mmW RANs may be unable to propagate through the at least one blocker 408.

The wireless communications environment 400 may include a set of relay devices 406a-c, each of which may be configured to relay signals between the UEs 404a-b and the base station 402 with the base station 402 acting as a donor node. That is, at least one of the relay devices 406a-c may provide a path to each of the UEs 404a-c for communication with the base station 402, for example, in order to avoid the at least one blocker 408 occluding the paths between the UEs 404a-b and the base station 402 and/or to extend the range of the base station 402 when the UEs 404a-b are out of the coverage area of the base station 402.

In some aspects, each of the relay devices 406a-c may be an Internet Access and Backhaul (IAB) node, which may be implemented in some RANs adhering to 3GPP standards. IAB node structure may support various architectures, including L1, L2, and/or L3 solutions. When implemented as an L3 solution, an IAB node may implement at least a portion of three layers of the radio protocol stack for relaying access links to UEs, including the PHY layer (e.g., of L1), the MAC, RLC, PDCP, and SDAP layers (e.g., of L2), and the RRC layer (e.g., of L3). When implemented as an L2 solution, an IAB node may implement at least a portion of two layers of the radio protocol stack for relaying access links to UEs, including the PHY layer (e.g., of L1), and the MAC, RLC, PDCP, and/or SDAP layers (e.g., of L2). When implemented as an L1 solution, an IAB node may implement only the PHY layer (e.g., of L1) for relaying access links to UEs.

Each of the relay devices 406a-c may be implemented as an L1 solution, which may be relatively simple, inexpensive, and/or low power. As an L1 relay device, each of the relay devices 406a-b may relay analog signals between the base station 402 and at least one of the UEs 404a-b on an access link. That is, each of the relay devices 406a-b may refrain from decoding and other processing commensurate with conversion of analog signals to digital signals and, instead, may forward an analog signal received with an RX antenna to at least one of the UEs 404a-b from the base station 402 (or vice versa) using a TX antenna. The relatively low cost, low complexity, and/or low power may allow many IAB nodes to be deployed, particularly when implemented as L1 solutions.

Deployment of many IAB nodes (e.g., including the relay devices 406a-c) may be possible, but connecting each of the many IAB nodes to a core network through the base station 402 using wired backhaul may be infeasible. Accordingly, IAB nodes may be configured for wireless backhaul, potentially with multiple hops between the base station 402 and some IAB nodes (e.g., including the second relay device 406b).

With wireless backhaul, each of the relay devices 406a-c may be wirelessly connected with the core network through the base station 402. However, wireless backhaul links may be carried on the same resources as the wireless access links between the base station 402 and each of the UEs 404a-b. For example, wireless backhaul links between the base station 402 and each of the relay devices 406a-c may share the same RAT (e.g., 5G NR RAT) and the same frequency band as the wireless access links between the base station 402 and each of the UEs 404a-b.

Figure 5:
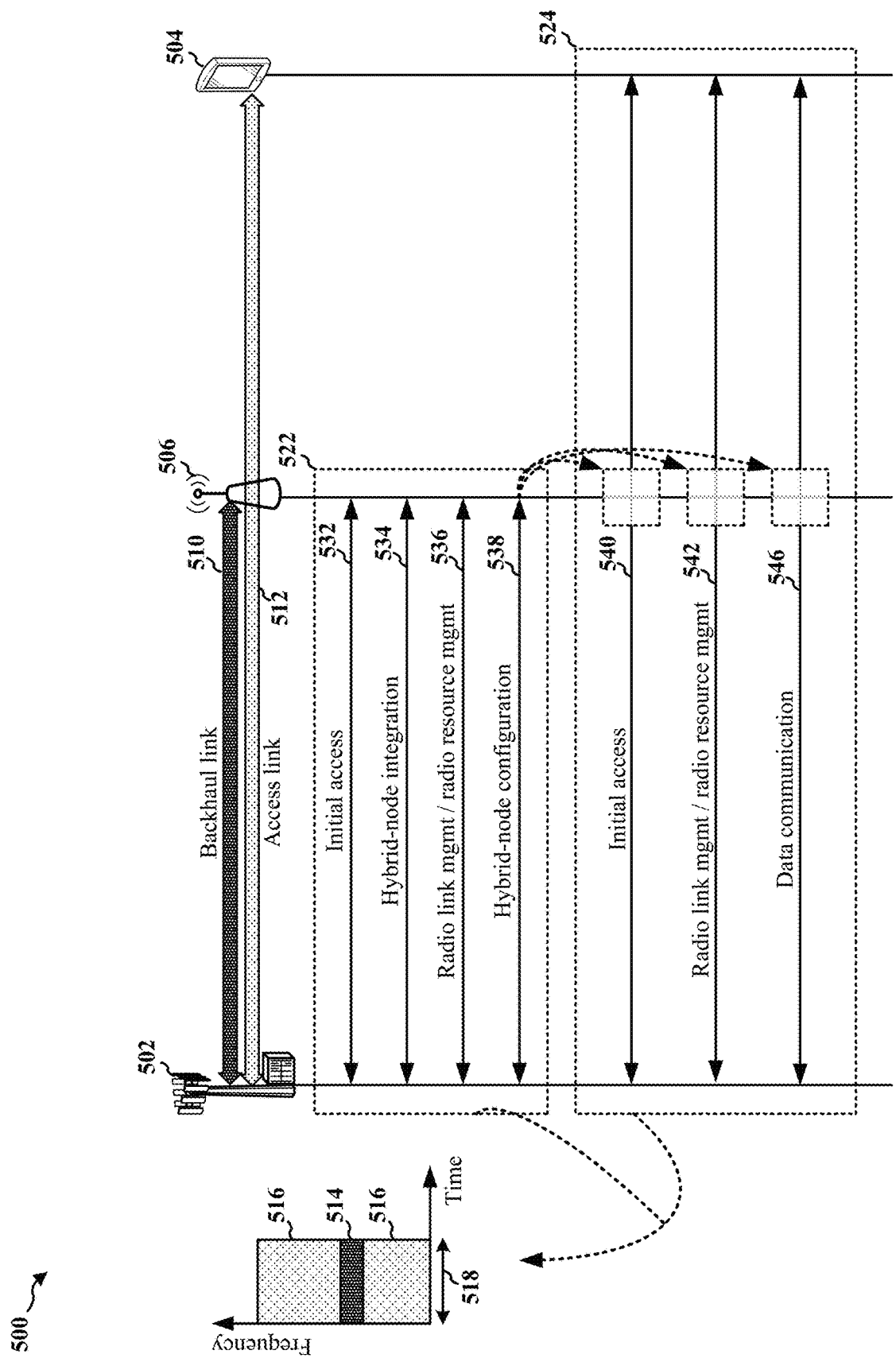
FIG. 5 is a call flow diagram illustrating an example of a wireless communications system in which a relay device communicates with a base station on a wireless backhaul link and relays signaling between the base station and a UE on a wireless access link.

FIG. 5 is a diagram illustrating a call flow in a wireless communications environment 500. The wireless communications environment 500 may include, inter alia, a base station 502, a UE 504, and a relay device 506. In the context of FIGS. 1, 3, and 4, the base station 502 may be implemented as the base station 102/180, the base station 310, and/or the base station 402, the UE 504 may be implemented as the UE 104, the UE 350, and/or one of the UEs 404a-b, and the relay device 506 may be implemented as the relay device 106 and/or one of the relay devices 406a-c.

The relay device 506 may be configured to communicate with the base station 502 on a backhaul link 510, which may be wireless. For establishment of the backhaul link 510, the relay device 506 may be configured to perform a set of backhaul-related procedures 522. First, the relay device 506 may perform an initial access procedure 532 with the base station 502. The initial access procedure 532 may include, for example, a search for synchronization signals transmitted by the base station 502 and a random access channel (RACH) procedure. In the initial access procedure 532, the relay device 506 may send a random access preamble to the base station 502 and receive a random access response from the base station 502, e.g., for a RACH procedure.

Next, the relay device 506 may perform a hybrid-node integration procedure 534 with the base station 502. For the hybrid-node integration procedure 534, the relay device 506 may provide information indicating that the relay device 506 is operating as a relay, as well as information indicating capabilities and configuration of the relay device 506. Such information may include, inter alia, a set of beams supported by the relay device 506 and/or power configuration(s) supported by the relay device 506.

Additionally, the relay device 506 may perform at least one radio link and/or radio resource management procedure 536 with the base station 502. In the radio link and/or radio resource management procedure 536, the base station 502 may configure one or more beams for communication between the relay device 506 and the base station 502, as well as configure a set of resources for communication between the relay device 506 and the base station 502 (e.g., resources for the backhaul link 510).

Further, the relay device 506 may perform a hybrid-node configuration procedure 538 with the base station 502. In the hybrid-node configuration procedure 538, the base station 502 may configure the relay device 506 with one or more parameters for relay operations, e.g., in which the relay device 506 relays signals between the base station 502 and the UE 504. For example, the base station 502 may configure the relay device 506 with various parameters associated with initial access by the UE 504, radio link and/or radio resource management associated with relay operations for the UE 504, a set of beams to use for relay operations, and/or a set of power levels to use for relay operations.

In some aspects of the hybrid-node configuration procedure 538, the base station 502 may configure, for the relay device 506, one or more of beamforming, power, transmission/reception switching, relay deployment, and/or associated scheduling. For example, the base station 502 may transmit a beamforming configuration to the relay device 506 that indicates one or more beams the relay device 506 is to use for transmission and/or reception on the backhaul link 510 and/or indicates one or more beams the relay device 506 is to use for relaying signals between the base station 502 and the UE 504. The base station 502 may further transmit a power configuration to the relay device 506 that indicates an amount of power the relay device 506 is to use for relaying signals between the base station 502 and the UE 504 and/or indicates an amount signals received from one of the base station 502 or the UE 504 are to be amplified before relaying those signals to the other of the base station 502 or the UE 504.

Still with reference to the hybrid-node configuration procedure 538, the base station 502 may transmit a transmission/reception switching configuration to the relay device 506 that indicates a direction in which the relay device 506 is to relay signals between the base station 502 and the UE 504—e.g., a transmission/reception switching configuration may indicate to the relay device 506 whether one or both of uplink signaling from the UE 504 and/or downlink signaling from the base station 502 are to be respectively relayed to the base station 502 or to the UE 504. Further, the base station 502 may transmit a relay deployment configuration to the relay device 506 that indicates a time and/or duration for which the relay device 506 may refrain from relaying signals between the base station 502 and the UE 504—e.g., a relay deployment configuration may indicate that the relay device 506 may switch off an analog radio frequency (RF) deployment so that the relay device 506 does not unnecessarily relay signals.

In connection with one or more of the configurations for beamforming, power, transmission/reception switching, and/or relay deployment, the base station 502 may transmit associated scheduling information to the relay device 506. Scheduling information may indicate a time and/or duration for which an associated configuration is to be applied for at least one of beamforming, power, transmission/reception switching, and/or relay deployment. For example, scheduling information configured by the base station 502 for the relay device 506 may indicate a time at which to change beamforming configurations or to change power configurations. In some aspects, the base station 502 may indicate a time and/or duration of scheduling information as one or more time resources, such as a symbol, slot, and/or subframe at which an associated one of the aforementioned configurations is to be applied.

Once configured to provide relay support for the base station 502, the relay device 506 may relay signals between the base station 502 and the UE 504 on an access link 512 for a set of access link-related procedures 524. For each of the access link-related procedures 524, the relay device 506 may refrain from processing and decoding the signals relayed between the base station 502 and the UE 504 on the access link 512. Instead, the relay device 506 may relay analog signals between the base station 502 and the UE 504.

Over the access link 512, the UE 504 may be configured to communicate in a mmW and/or near-mmW RAN (e.g., a 5G NR RAN) and, therefore, may utilize beamforming. However, the UE 504 may be out of a coverage area provided by the base station 502 and/or path(s) between the UE 504 and the base station 502 may be occluded such that beamformed communication is impractical (see, e.g., FIG. 4, supra). Thus, the access link 512 may traverse the relay device 506, such as to extend coverage of the base station 502 to the UE 504 and/or to provide an alternative communications path between the base station 502 and the UE 504, thereby allowing the UE 504 to benefit from mmW/near-mmW communication.

In some aspects, the UE 504 may be connected with the base station 502 without traversing the relay device 506 in another portion of the frequency spectrum. For example, the UE 504 may communicate with the base station 502 in a sub-6 or sub-7 GHz band, such as for LTE communication.

Through the relay device 506, the UE 504 may perform an initial access procedure 540 with the base station 502. The initial access procedure 540 may include, inter alia, a RACH procedure in which the UE 504 transmits a random access preamble to the base station 502 and the base station 502 transmits a random access response to the UE 504, both of which may be relayed by the relay device 506 (e.g., as analog signals).

In addition, a radio link and/or radio resource management procedure 542 may be performed between the base station 502 and the UE 504. For example, the base station 502 may configure a set of resources on which to communicate with the UE 504 on the access link 512.

Subsequently, the base station 502 and the UE 504 may perform data communication 546 on the access link 512. For example, the relay device 506 may relay downlink and/or uplink data between the base station 502 and the UE 504 for the access link 512. As aforementioned, the relay device 506 may relay the downlink and/or uplink data as analog signals—that is, the relay device 506 may refrain from decoding and/or other processing, which would otherwise convert the analog signals to digital.

While relaying signals between the base station 502 and the UE 504 for one or more of the access link-related procedures 524 (e.g., at least for the data communication 546), the base station 502 may contemporaneously configure (or reconfigure) the relay device 506. To do so, the base station 502 and the relay device 506 may communicate via a control interface on the backhaul link 510. The control interface on the backhaul link 510 may support communication of control signaling between the base station 502 and the relay device 506, which may include support for communication of information associated with the control signaling, such as uplink information transmitted from the relay device 506 to the base station 502 upon which the base station 502 may base configuration of some control information for the relay device 506.

As both the backhaul link 510 and the access link 512 may be wireless, the control interface on the backhaul link 510 may share at least a portion of time and/or frequency resources with the access link 512. For example, both the access link 512 and the control interface on the backhaul link 510 may be configured in a mmW/near-mmW band, such as Frequency Range 2 (FR2) in a 5G NR RAN. Consequently, one set of resources that is to carry control signaling for the relay device 506 on the backhaul link 510 may at least partially overlap with another set of resources that is to carry relay signaling (e.g., data and/or control information communicated between the base station 502 and the UE 504) on the portion of the access link 512 between the base station 502 and the relay device 506.

Therefore, control signaling on the backhaul link 510 may be multiplexed with relay signaling on the access link 512 when communicated between the base station 502 and the relay device 506. Multiplexing of control signaling with relay signaling may be at least one of time-division multiplexing (TDM), frequency-division multiplexing (FDM), and/or space-division multiplexing (SDM).

Illustratively, the base station 502 may frequency-division multiplex control signaling 514 on the backhaul link 510 with relay signaling 516 (e.g., data and/or control information communicated between the base station 502 and the UE 504) on the access link 512. For example, the control signaling 514 and the relay signaling 516 may be frequency-division multiplexed in at least one slot 518 (e.g., the control signaling 514 and the relay signaling 516 may be frequency-division multiplexed in one or more symbols of one or more slots, including the slot 518).

The control signaling 514 may occupy a relatively small or narrow bandwidth part of an available system bandwidth (e.g., FR2), whereas the relay signaling 516 may occupy a relatively wider bandwidth part of the available system bandwidth (e.g., potentially, the relay signaling 516 may occupy the full system bandwidth excluding the narrow bandwidth part occupied by the control signaling 514). However, control signaling 514 on the backhaul link 510 may not always be frequency-division multiplexed with relay signaling 516 on the access link 512, as some configurations preclude simultaneous reception of control signaling 514 and relay signaling 516 by the relay device 506. In particular, at least one of a beamforming configuration and/or a power configuration may affect multiplexing of control signaling 514 and relay signaling 516.

According to some aspects, a beamforming configuration may affect multiplexing of control signaling 514 and relay signaling 516. The base station 502 may configure beamforming at the relay device 506 with a beam pair link based on the relay signaling 516; however, the beam pair link configured based on the relay signaling 516 may be unsuitable to convey the control signaling 514. For example, the frequency region carrying the control signaling 514 via the configured beam pair link may be in a relatively deep fade and, therefore, the relay device 506 may be unable to simultaneously receive the wider-band relay signaling 516 frequency-division multiplexed with the narrower-band control signaling 514. The base station 502, then, may determine to refrain from frequency-division multiplexing the control signaling 514 and the relay signaling 516 based on a beamforming configuration to be applied for the relay signaling 516 that is unsuitable for the control signaling 514.

According to some other aspects, a power configuration may affect multiplexing of control signaling 514 and relay signaling 516. The base station 502 may configure a transmission power setting and/or a reception power setting for the relay signaling 516 on the access link 512. However, the power setting(s) configured for the relay signaling 516 may be unsuitable for the control signaling 514. For example, reception by the relay device 506 of relatively stronger (e.g., higher power) relay signaling 516 in the analog may be acceptable, or even desirable, on the downlink of the access link 512; however, the relay device 506 may more suited to relatively less strong (e.g., relatively weaker) control signaling 514 on the downlink of the backhaul link 510. For example, relatively less strong control signaling 514 on the downlink of the backhaul link 510 may facilitate intermediate frequency (IF) and/or baseband processing by the relay device 506. The base station 502, then, may determine to refrain from frequency-division multiplexing the control signaling 514 and the relay signaling 516 based on conflicting power configurations for the relay signaling 516 and the control signaling 514.

In another example of an effect of a power configuration on multiplexing of control signaling 514 and relay signaling 516, one uplink transmission power setting according to which the relay device 506 should be configured for uplink control signaling 514 on the backhaul link 510 may conflict with another uplink transmission power setting according to which the relay device 506 should be configured for uplink relay signaling 516 on the access link 512. The base station 502, then, may determine that the relay device 506 is to refrain from frequency-division multiplexing uplink control signaling 514 and uplink relay signaling 516 based on conflicting power configurations for the uplink relay signaling and the uplink control signaling. Accordingly, the base station 502 may configure the relay device 506 over the backhaul link 510 to refrain from frequency-division multiplexing uplink control signaling 514 on the backhaul link 510 with uplink relay signaling 516 on the access link 512.

While resources configured to carry control signaling via a control interface on a backhaul link still at least partially overlap with resources configured to carry relay signaling on an access link, multiplexing control signaling and relay signaling may be unavoidable, even though FDM is potentially not implementable, unless one of controlling signaling or relay signaling is prioritized over the other one of control signaling or relay signaling. The present disclosure may provide various techniques and approaches for communicating control signaling on a backhaul link and relay signaling on an access link when the backhaul link and the access link are configured on a set of common resources.

In some aspects of the present disclosure, control signaling configured to be carried on a set of resources that at least partially overlaps with a set of resources configured to carry relay signaling on an access link may be multiplexed according to at least one of SDM, FDM, and/or TDM. In some other aspects of the present disclosure, one of control signaling or relay signaling may be prioritized over the other one of control signaling and relay signaling when the control signaling and the relay signaling are configured to be carried on a set of overlapping or common resources. A base station may determine which of the at least one of SDM, FDM, and/or TDM is to be applied for control signaling and relay signaling and/or may determine prioritization of control signaling and relay signaling when a backhaul link configured to carry control signaling and an access link configured to carry relay signaling are configured to share the same resources.

Figure 6:
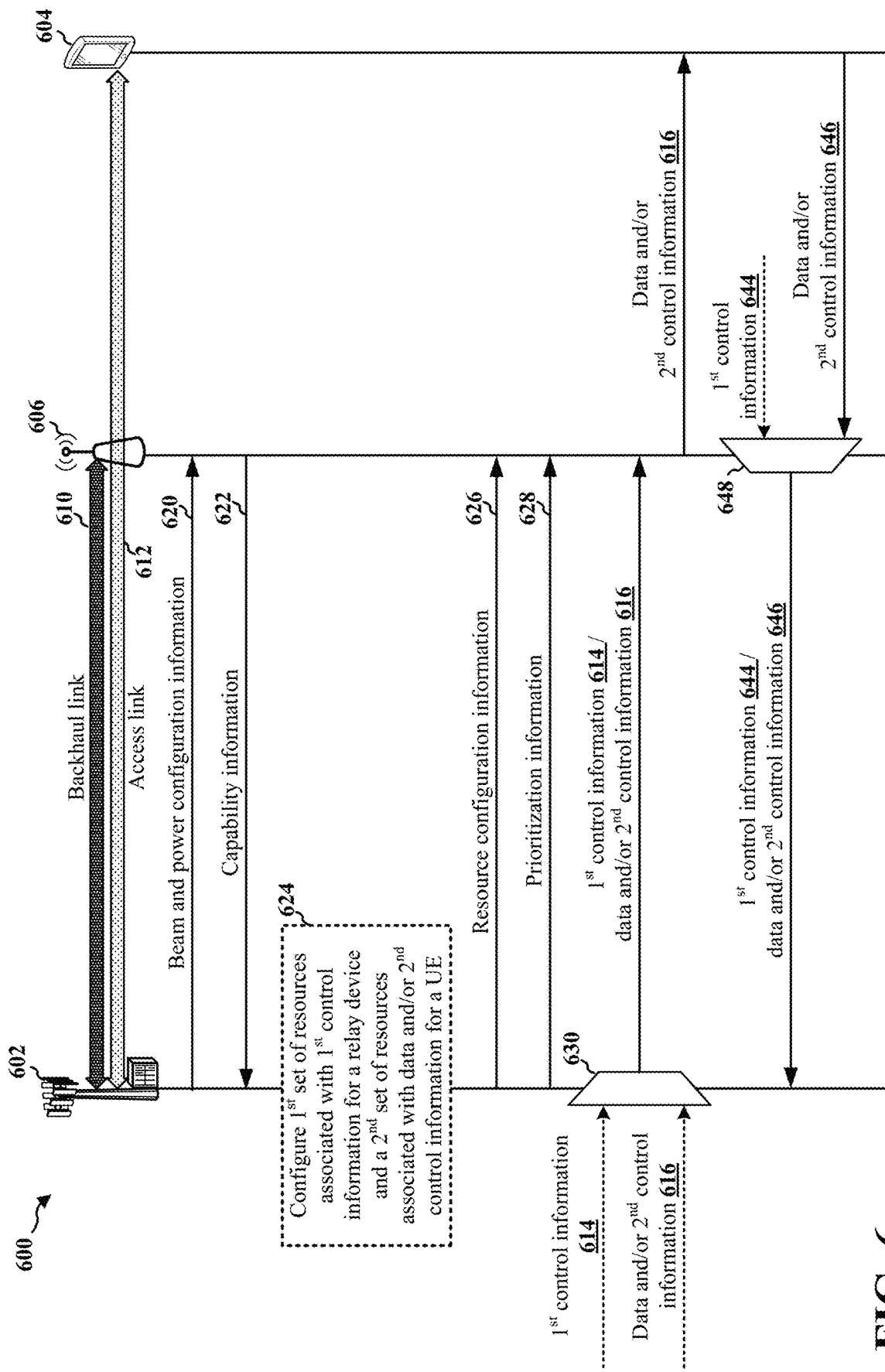
FIG. 6 is a call flow diagram illustrating another example of a wireless communications system in which a relay device communicates with a base station on a wireless backhaul link and relays signaling between the base station and a UE on a wireless access link.

FIG. 6 is a diagram illustrating a call flow in a wireless communications environment 600. The wireless communications environment 600 may include, inter alia, a base station 602, a UE 604, and a relay device 606. In the context of FIGS. 1 and 3-5, the base station 602 may be implemented as the base station 102/180, the base station 310, the base station 402, and/or the base station 502, the UE 604 may be implemented as the UE 104, the UE 350, one of the UEs 404a-b, and/or the UE 504, and the relay device 606 may be implemented as the relay device 106, one of the relay devices 406a-c, and/or the relay device 506.

The base station 602 and the relay device 606 may be configured to communicate over a backhaul link 610, while the relay device 606 may be configured to forward signaling between the base station 602 and the UE 604 over an access link 612. In order to communicate on both the backhaul link 610 and the access link 612, the base station 602 may configure one or more beam pair links and one or more power settings for the relay device 606.

Specifically, the base station 602 may configure, for the relay device 606, a first beam pair link for communication on the backhaul link 610 and a second beam pair link for communication on the access link 612 and, further, may configure a first power setting for communication on the backhaul link 610 and a second power setting for communication on the access link 612.

According to various aspects, beam pair link may include at least one TX beam at one of the base station 602 or the relay device 606 and a corresponding at least one RX beam at the other of the base station 602 or the relay device 606 (e.g., as described with respect to FIG. 4, supra). A beam pair link may be used for one or both of uplink communication to the base station 602 from the relay device 606 and/or downlink communication from the base station 602 to the relay device 606.

A power setting may include one or more values or parameters according to which the relay device 606 is to configure communication. For example, a power setting may include at least one value that configures a transmission or reception power at the relay device 606. In another example, a power setting may include at least one parameter based on which the relay device 606 may determine (e.g., calculate) a transmission or reception power at the relay device 606.

In some aspects, the first and second beam pair links and/or the first and second power settings may be equivalent (e.g., the same, having some or all values being equal, having corresponding fields configured the same, etc.). In other words, signaling on the backhaul link 610 and signaling on the access link 612 may potentially use the same beam pair link and/or the same power setting. In some other aspects, the first and second beam pair links and/or the first and second power settings may be different (e.g., having some or all values being unequal, having corresponding fields differently configured, etc.).

The base station 602 may transmit, to the relay device 606, configuration information 620 that indicates configurations for the one or more beam pair links and one or more power settings. Correspondingly, the relay device 606 may receive the configuration information 620 from the base station 602, and may apply the configurations of the one or more beam pair links and the one or more power settings for communication with the base station 602 on the backhaul link 610 and the access link 612.

As both the backhaul link 610 and the access link 612 may be wireless, the time and frequency resources available for the backhaul link 610 may at least partially overlap with the time and frequency resources for the access link 612. In some aspects, however, the relay device 606 may or may not be capable of simultaneous transmission and/or simultaneous reception—that is, the relay device 606 may or may not be capable of communicating over the backhaul link 610 and the access link 612 on overlapping time resources. For example, the relay device 606 may be unable to activate a sufficient number of RF chains (e.g., two RF chains) to simultaneously transmit or receive via two different beam pair links and/or with two different power settings. Thus, the relay device 606 may transmit, to the base station 602, capability information 622 that indicates a capability of the relay device 606 to communicate (e.g., transmit or receive) control signaling over the backhaul link 610 and relay signaling over the access link 612 on overlapping time resources.

For the backhaul link 610 and the access link 612, the base station 602 may respectively configure 624 a first set of resources associated with the first control information 614 for the relay device 606 and a second set of resources associated with the data and/or second control information 616 for the UE 604. The base station 602 may configure 624 the first and second sets of resources to be overlapping in at least one of time and/or frequency.

The base station 602 may configure 624 the first and second sets of resources based on one or more factors. In one aspect, the base station 602 may configure 624 the first and second sets of resources based on at least one of the configurations for the beam pair link(s), power setting(s), and/or capability(s) associated with communication with the relay device 606. For example, the base station 602 may configure 624 the first and second sets of resources based on at least one of the beam and power configuration information 620 transmitted to the relay device 606 and/or the capability information 622 received from the relay device 606. In some other aspects, the base station 602 may configure 624 the first and second sets of resources based on at least one of a schedule/configuration associated with data and/or control information to be communicated with the UE 604 over the access link 612 and/or a schedule/configuration associated with control information to be communicated over the backhaul link 610.

In some aspects, a beam pair link configured for the access link 612 may be unsuitable to be used for the backhaul link 610. That is, the relay device 606 may be unable to use a beam pair link configured for communication on the access link 612 to simultaneously communicate on the backhaul link 610. For example, the beam pair link configured for communication on the access link 612 may be indicated in the beam and power configuration information 620, but may be associated with poor channel quality (e.g., a relatively deep fade) in the frequency region for the backhaul link 610, thereby preventing the relay device 606 from simultaneously receiving control signaling over the backhaul link 610 and relay signaling over the access link 612 via the same beam pair link. In another example, the capability information 622 may indicate that the UE 604 is incapable of communicating over the backhaul link 610 and the access link 612 on overlapping time resources. When the relay device 606 is unable to use a beam pair link configured for communication on the access link 612 to simultaneously communicate on the backhaul link 610, the base station 602 may determine that the first and second sets of resources are not to share any overlapping time resources and, therefore, should not be multiplexed according to FDM.

Similarly, a power setting configured for the access link 612 may be unsuitable to be used for the backhaul link 610. For example, a power setting configured for the access link 612 may be so large that communication over the backhaul link 610 would be degraded if such a power setting were used for communication over the backhaul link 610. When a power setting configured for the access link 612 is unsuitable to be used for the backhaul link 610, the relay device 606 may be unable to satisfactorily communicate over the backhaul link 610 and the access link 612 on overlapping time resources.

As the base station 602 may respectively configure one or more power settings for the backhaul link 610 and the access link 612, the base station 602 may be aware of when the relay device 606 is unable to satisfactorily communicate over the backhaul link 610 and the access link 612 on overlapping time resources. Accordingly, when the relay device 606 is unable to use a power setting configured for communication on the access link 612 to simultaneously communicate on the backhaul link 610, the base station 602 may determine that the first and second sets of resources are not to share any overlapping time resources and, therefore, should not be multiplexed according to FDM.

When the base station 602 determines that the first and second sets of resources are not to be overlapping in time, the base station 602 may determine that the first and second sets of resources are to be configured for at least one of TDM and/or SDM. For example, when the base station 602 determines that the first and second sets of resources are not to be overlapping in time, the base station 602 may configure 624 the first and second sets of resources to be at least partially overlapping in frequency—e.g., so that control information to be communicated over the backhaul link 610 and data and/or control information to be communicated with the UE 604 over the access link 612 are multiplexed according to TDM.

In some aspects, however, the base station 602 may determine that the first and second sets of resources are to be at least partially overlapping in time when the beam pair link configured for communication over the access link 612 is also used for communication over the backhaul link 610, when the power setting for communication over the access link 612 is also used for communication over the backhaul link 610, and when the relay device 606 is capable of simultaneously communicating over the backhaul link 610 and the access link 612. In some aspects, when the base station 602 determines that the first and second sets of resources are to be at least partially overlapping in time, control information to be communicated over the backhaul link 610 and data and/or data and/or control information to be communicated with the UE 604 over the access link 612 may be multiplexed according to FDM. In some other aspects, when the base station 602 configures the first and second sets of resources to be at least partially overlapping in time, the base station 602 may further configure control information on the first set of resources over the backhaul link 610 and data and/or control information on the second set of resources over the access link 612 to be multiplexed according to SDM.

In still other aspects, when the base station 602 configures the first and second sets of resources to be partially overlapping in time, the base station 602 may configure one or more common signals used for both control signaling on the backhaul link 610 and relay signaling on the access link 612 to be carried on common resources of the partially overlapping first and second set of resources. Examples of such common signals that may be used for both control signaling on the backhaul link 610 and relay signaling on the access link 612 may include some reference signals and/or some signals carried on broadcast channels to be used by both the relay device 606 and the UE 604.

Once the base station 602 has configured the first set of resources associated with control information for the relay device 606 on the backhaul link 610 and the second set of resources associated with data and/or control information for the UE 604 on the access link 612, the base station 602 may send information indicating the first and second resource configurations to the relay device 606. Accordingly, the relay device 606 may be configured to monitor the first and second sets of resources for the backhaul link 610 and for the access link 612, respectively.

In some aspects, the base station 602 may configure the first and second sets of resources to be at least partially overlapping in time. However, the relay device 606 may determine that the relay device 606 is unable to support simultaneous communication over both the backhaul link 610 and the access link 612, e.g., even the base station 602 may attempt to avoid such a configuration. The base station 602 may configure the first and second sets of resources to be at least partially overlapping in time even though respective beam configurations conflict between the backhaul link 610 and the access link 612, respective power configurations conflict between the backhaul link 610 and the access link 612, and/or such overlapping time resources conflict with the capability of the relay device 606, for example, because not all communications are predictable (e.g., some resources may be semi-statically configured for uplink and/or downlink communication, but a signal may not always be communicated on those resources, as with RACH signals, scheduling request (SR) signals, and/or signals on the PDCCH) and/or because of the relatively large time and/or signaling overhead associated with configuring the first and second sets of resources to avoid all possible beam configuration conflicts, power configuration conflicts, and/or capability-related conflicts.

Thus, a respective priority may be assigned to each of control information on the backhaul link 610 and data/control information on the access link 612. Respective priorities may indicate which of control information on the backhaul link 610 or data/control information on the access link 612 is to be prioritized over the other. For example, the control information on the backhaul link 610 may be assigned a relatively higher priority than that assigned to the data/control information on the access link 612, or vice versa.

In some aspects, prioritization may be based on the type of uplink and/or downlink signals communicated over the backhaul link 610. For example, some downlink reference signals and/or broadcast signals may be associated with a relatively lower priority, such as SS/PBCH blocks, CSI-RSs, and/or SIBS. Accordingly to another example, communications that are semi-statically configured in the uplink and/or downlink may be associated with a relatively lower priority. Conversely, communications that are dynamically scheduled on uplink and/or downlink channels may be associated with a relatively higher priority.

In some aspects, the base station 602 may configure the prioritizations of the backhaul link 610 and the access link 612. The base station 602 may configure the expected operations of the relay device 606 on different subsets of resources, including which of the backhaul link 610 or the access link 612 is to be prioritized over the other. For example, the base station 602 may configure the relay device 606 to prioritize signaling over the backhaul link 610 in a first subset of resources, but may configure the relay device 606 to prioritize signaling over the access link 612 in a second subset of resources.

The base station 602 may transmit prioritization information 628 indicating the relative prioritizations associated with the backhaul link 610 and the access link 612 to the relay device 606. The prioritization information 628 may explicitly or implicitly indicate the relative prioritizations associated with the backhaul link 610 and the access link 612.

In some aspects, the base station 602 may configure the relay device 606 with uplink ACK feedback for DCI carried on the backhaul link 610, e.g., so that DCI on the backhaul link 610 is protected in case of a conflict in which data/control information on the access link 612 is prioritized over the DCI on the backhaul link 610 and the DCI is missed.

In some other aspects, the prioritization information 628 may indicate expected operations of the relay device 606 on different subsets of resources. For example, on a first subset of resources, the prioritization information 628 may indicate that the base station 602 configures the relay device 606 to prioritize operations associated with the backhaul link 610 (e.g., operations associated with the control interface between the base station 602 and the relay device 606) over operations associated with the access link 612 (e.g., operations associated with a relay interface between the base station 602 and the UE 604 through the relay device 606). On a second subset of resources, however, the prioritization information 628 may indicate that the base station 602 configures the relay device 606 to prioritize operations associated with the access link 612 over operations associated with the backhaul link 610.

If the first and second sets of resources are configured for downlink, the base station 602 may have control information 614 for the relay device 606 and data/control information 616 for the UE 604. The base station 602 may multiplex 630 the control information 614 and the data/control information 616 for transmission on the configured first and second sets of resources. For example, when the first and second sets of resources at least partially overlap in time, the base station 602 may multiplex the control information 614 and the data/control information 616 according to one of FDM and/or SDM. In another example, when the first and second sets of resources at least partially overlap in time, the base station 602 may multiplex one or more common signals (e.g., reference signals or signals on a broadcast channel used by both the relay device 606 and the UE 604) on to the overlapping time resources of the first and second sets of configured resources. When, however, the first and second sets of resources at least partially overlap in frequency, the base station 602 may multiplex the control information 614 and the data/control information 616 according to FDM.

Subsequently, the base station 602 may transmit the control information 614 on the backhaul link 610 multiplexed with the data/control information 616 on the access link 612. The relay device 606 may receive the control information 614 on the backhaul link 610 multiplexed with the data/control information 616 on the access link 612. Accordingly, the relay device 606 may decode and process the control information 614 on the backhaul link 610 to be applied at the relay device 606; that is, the relay device 606 may be the terminal reception point for the control information 614 on the backhaul link 610.

According to aspects in which reception of the control information 614 on the backhaul link 610 conflicts with reception of the data/control information 616 on the access link 612, the relay device 606 may prioritize reception of one over the other, e.g., based on the prioritization information 628 received from the base station 602. For example, the relay device 606 may apply a beam pair link and/or power setting associated with the prioritized one of the control information 614 or data/control information 616. The relay device 606 may then attempt to receive both the control information 614 and the data/control information 616 using the beam pair link and/or power setting associated with the prioritized one of the control information 614 or data/control information 616 and applied by the relay device 606. Potentially, the relay device 606 may miss the deprioritized one of the control information 614 or data/control information 616.

The relay device 606 may forward the data/control information 616 on the access link 612 to the UE 604. The relay device 606 may forward the data/control information 616 as analog signals and, therefore, the relay device 606 may refrain from converting the analog signals conveying the data/control information 616 to digital.

If the first and second sets of resources are configured for uplink, the relay device 606 may have control information 644 for the base station 602. In addition, the relay device 606 may receive uplink data/control information 646 for the base station 602 from the UE 604. The relay device 606 may multiplex 648 the uplink control information 644 and the uplink data/control information 646 for transmission on the configured first and second sets of resources. For example, when the first and second sets of resources at least partially overlap in time, the relay device 606 may multiplex the control information 644 and the data/control information 646 according to one of FDM and/or SDM. In another example, when the first and second sets of resources at least partially overlap in time, the relay device 606 may multiplex one or more common signals (e.g., reference signals or other common signals used by both the relay device 606 and the base station 602) on to the overlapping time resources of the first and second sets of configured resources. When, however, the first and second sets of resources at least partially overlap in frequency, the relay device 606 may multiplex the control information 644 and the data/control information 646 according to FDM.

Subsequently, the relay device 606 may transmit the control information 644 on the backhaul link 610 multiplexed with the data/control information 646 on the access link 612. The base station 602 may receive the control information 644 on the backhaul link 610 multiplexed with the data/control information 646 on the access link 612.

According to aspects in which transmission of the control information 644 on the backhaul link 610 conflicts with transmission of the data/control information 646 on the access link 612, the relay device 606 may prioritize transmission of one over the other, e.g., based on the prioritization information 628 received from the base station 602. For example, the relay device 606 may apply a beam pair link and/or power setting associated with the prioritized one of the control information 644 or data/control information 646. The relay device 606 may then transmit both the control information 644 and the data/control information 646 using the beam pair link and/or power setting associated with the prioritized one of the control information 644 or data/control information 646 and applied by the relay device 606.

Figure 7:
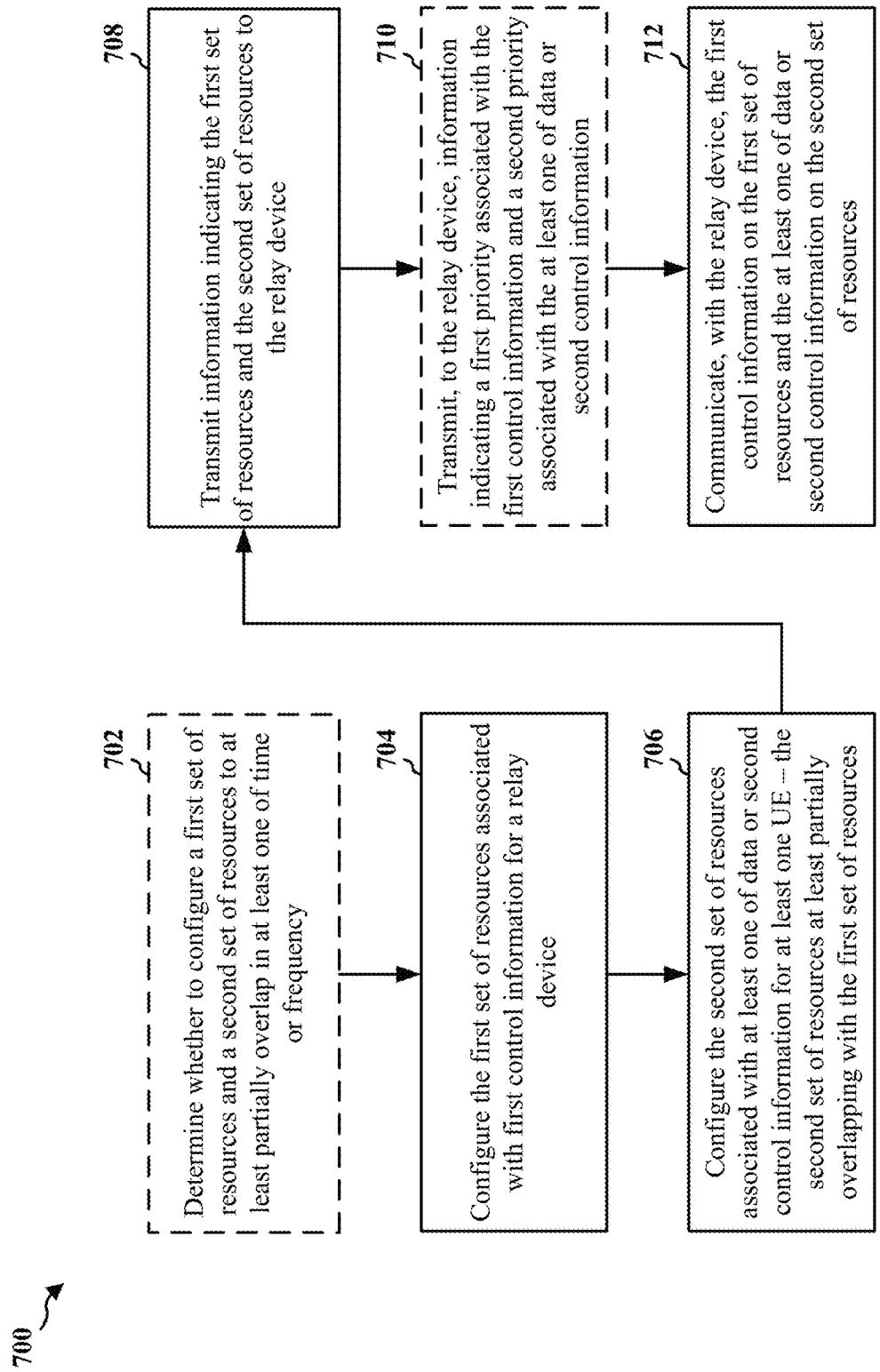
FIG. 7 is a flowchart of a method of wireless communication by a base station.

FIG. 7 is a flowchart of a method 700 of wireless communication. In some aspects, the method 700 may be performed by a base station, such as the base station 102/180, the base station 310, the base station 402, the base station 502, and/or the base station 602, described supra. In some other aspects, the method 700 may be performed by an apparatus, such as the apparatus 902, which may be the entire base station 310 or may be one or more components thereof, including the memory 376 and/or at least one of the TX processor 316, the RX processor 370, and/or the controller/processor 375. According to various aspects, one or more of the illustrated operations may be transposed, omitted, and/or contemporaneously performed.

At operation 702, the base station may determine whether to configure a first set of resources and a second set of resources to at least partially overlap in at least one of time or frequency. In some other aspects, the base station may determine whether to configure the first and second sets of resources to at least partially overlap in at least one of time and/or frequency based on a capability of the relay device to support communication of first control information and communication of at least one of data and/or control information on overlapping time resources. The base station may receive information indicating the capability of the relay device to support communications on overlapping time resources from the relay device.

In some other aspects, the base station may determine whether to configure the first and second sets of resources to at least partially overlap in at least one of time and/or frequency based on a first beamforming configuration associated with the first set of resources, a second beamforming configuration associated with the second set of resources, a first power configuration associated with the first set of resources, and/or a second power configuration associated with the second set of resources. The base station may configure each of the beamforming configurations and the power configurations for the relay device, and may transmit information indicating these configurations to the relay device.

The base station may determine that the first and second sets of resources are to be configured to at least partially overlap in time when the first beamforming configuration and the second beamforming configuration are equivalent (e.g., the same, having the same values, having corresponding fields configured the same, etc.) and, additionally, when the first power configuration and the second power configuration are equivalent (e.g., the same, having the same values, having corresponding fields configured the same, etc.). Conversely, the base station may determine that the first and second sets of resources are to be configured to be non-overlapping in time when the first beamforming configuration is different from the second beamforming configuration (e.g., having some or all values being unequal, having corresponding fields differently configured, etc.) and/or when the first power configuration is different from the second power configuration (e.g., having some or all values being unequal, having corresponding fields differently configured, etc.).

In the context of FIG. 6, for example, the base station 602 may determine whether to configure the first set of resources and the second set of resources to at least partially overlap in at least one of time or frequency. The base station 602 may make this determination based on at least one of the capability information 622 indicated by the relay device 606 and/or the beam and power configuration information 620 with which the relay device 606 is configured.

At operation 704, the base station may configure a first set of resources associated with first control information for a relay device. For example, referring to FIG. 6, the base station 602 may configure 624 the first set of resources associated with the control information 614 for downlink transmission to the relay device 606 on the backhaul link 610. In another example of FIG. 6, the base station 602 may configure 624 the first set of resources associated with the control information 644 for uplink reception from the relay device 606 on the backhaul link 610.

At operation 706, the base station may configure a second set of resources associated with at least one of data or second control information for at least one UE. The base station may configure the first and second sets of resources to be at least partially overlapping in at least one of time or frequency. For example, referring to FIG. 6, the base station 602 may configure 624 the second set of resources associated with the data/control information 616 for downlink transmission to the UE 604 through the relay device 606 on the access link 612. In another example of FIG. 6, the base station 602 may configure 624 the second set of resources associated with the data/control information 646 for uplink reception from the UE 604 through the relay device 606 on the access link 612.

At operation 708, the base station may transmit information indicating the first set of resources and indicating the second set of resources to the relay device. For example, referring to FIG. 6, the base station 602 may transmit the resource configuration information 626 to the relay device 606. The resource configuration information 626 may indicate, to the relay device 606, the first and second sets of resources configured 624 by the base station 602.

At operation 710, the base station may transmit, to the relay device, information indicating a first priority associated with the first control information and indicating a second priority associated with the at least one of data and/or second control information. The first and second priorities may indicate to the relay device which beam pair link and/or power setting the relay device is to apply when communicating the first control information and the at least one of data and/or second control information, e.g., if the relay device is unable to communicate the first control information and the at least one of data and/or second control information on overlapping time resources.

Referring to FIG. 6, for example, the base station 602 may transmit, to the relay device 606, the prioritization information 628. In the downlink, the prioritization information 628 may indicate which beam pair link and/or power setting configuration should be applied by the relay device 606 for receiving the control information 614 and the data/control information 616, e.g., if the relay device 606 is unable to simultaneously receive the control information 614 and the data/control information 616. In the uplink, the prioritization information 628 may indicate which beam pair link and/or power setting configuration should be applied by the relay device 606 for transmitting the control information 644 and the data/control information 646, e.g., if the relay device 606 is unable to simultaneously transmit (or time-division multiplex) the control information 644 and the data/control information 646.

At operation 712, the base station may communicate, with the relay device, the first control information on the first set of resources and the at least one of data and/or second control information on the second set of resources. The at least one of data and/or second control information may be relayed between the base station and the UE by the relay device.

In the downlink, for example, the base station may transmit the first control information on the first set of resources and the at least one of data and/or second control information on the second set of resources to the relay device. The relay device may be configured to forward the at least one of data and/or second control information to the UE. In the uplink, for example, the base station may receive the first control information on the first set of resources and the at least one of data and/or second control information on the second set of resources from the relay device. The relay device may be configured to forward the at least one of data and/or second control information on the second set of resources to the base station from the UE.

According to some aspects, the first control information may include backhaul DCI for which uplink ACK feedback with the base station is configured. When configured, the base station may receive ACK feedback from the relay device indicating successful reception of the DCI carried at least partially on the first set of resources (e.g., over the backhaul link). Absent ACK feedback from the relay device indicating the successful reception of the DCI, the base station may retransmit the DCI to the relay device over the backhaul link at a later time.

Referring to FIG. 6, in the downlink, the base station 602 may multiplex 630 the control information 614 on the first set of resources and the data/control information 616 on the second set of resources, and transmit the multiplexed control information 614 and data/control information 616 to the relay device 606. Alternatively, in the uplink, the relay device 606 may multiplex 648 the control information 644 on the first set of resources and the data/control information 646 on the second set of resources, and the base station 602 may receive the multiplexed control information 644 and data/control information 646 from the relay device 606.

Figure 8:
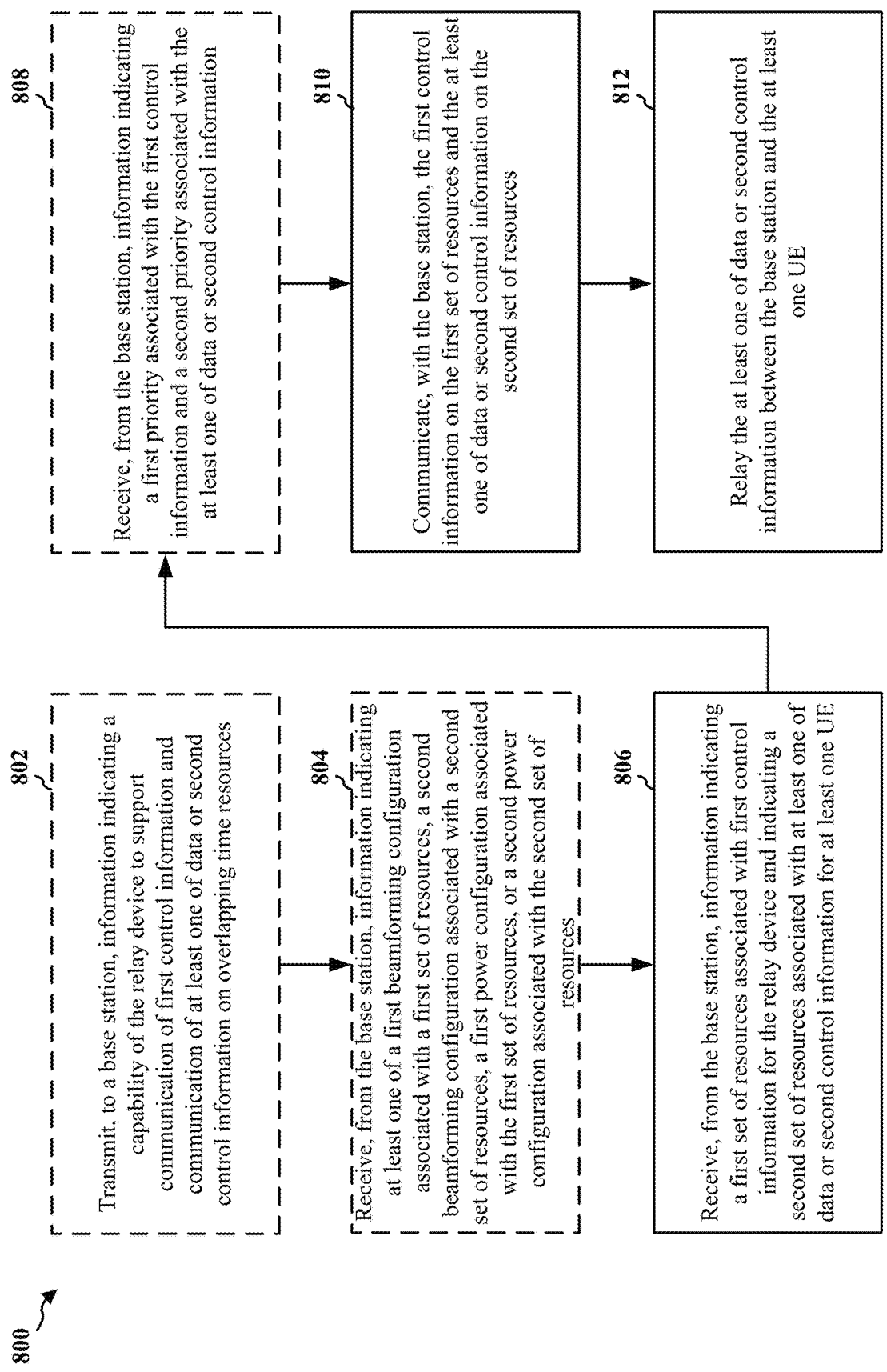
FIG. 8 is a flowchart of a method of wireless communication by a relay device.

FIG. 8 is a flowchart of a method 800 of wireless communication. In some aspects, the method 800 may be performed by an IAB node and/or a base station, such as the relay device 106, one of the relay devices 406a-c, the relay device 506, and/or the relay device 606, described supra. In some other aspects, the method 800 may be performed by an apparatus, such as the apparatus 1002, which may be the entire base station 310 (e.g., configured as an IAB node) or may be one or more components thereof, including the memory 376 and/or at least one of the TX processor 316, the RX processor 370, and/or the controller/processor 375. According to various aspects, one or more of the illustrated operations may be transposed, omitted, and/or contemporaneously performed.

At operation 802, the relay device may transmit, to a base station, information indicating a capability of the relay device to support communication of first control information and communication of at least one of data and/or second control information on overlapping time resources. The first control information may be associated with a backhaul link between the base station and the relay device, whereas the at least one of data and/or second control information may be associated with an access link between the base station and at least one UE through the relay device.

Referring to FIG. 6, for example, the relay device 606 may transmit, to the base station 602, the capability information 622. For the downlink, the capability information 622 may indicate whether the relay device 606 is capable of receiving the control information 614 and receiving the data/control information 616 on overlapping time resources. For the uplink, the capability information 622 may indicate whether the relay device 606 is capable of transmitting the control information 644 and transmitting the data/control information 646 on overlapping time resources—e.g., the capability information 622 may indicate whether the relay device 606 is capable of time-division multiplexing the control information 644 and the data/control information 646 on overlapping frequency resources.

At operation 804, the relay device may receive, from the base station, information indicating at least one of a first beamforming configuration associated with a first set of resources, a second beamforming configuration associated with a second set of resources, a first power configuration associated with the first set of resources, and/or a second power configuration associated with the second set of resources. In some aspects, the first beamforming configuration may indicate a first beam pair link based on which the relay device may apply a first beam corresponding thereto for communication on the first set of resources, which may be associated with the backhaul link. The second beamforming configuration may indicate a second beam pair link based on which the relay device may apply a second beam corresponding thereto for communication on the second set of resources, which may be associated with the access link.

In some other aspects, the first power configuration may indicate a first power setting according to which the relay device may communicate on the first set of resources, e.g., over the backhaul link. The second power configuration may indicate a second power setting according to which the relay device may communicate on the second set of resources, e.g., over the access link. Potentially, the first beam and the second beam may be the same beam and/or the first power setting and the second power setting may the same power setting.

For example, referring to FIG. 6, the relay device 606 may receive, from the base station 602, the beam and power configuration information 620, which may indicate one or more of first and second beam pair links and/or first and second power settings. The relay device 606 may communicate on the backhaul link 610 based on the first beam pair link and first power setting, and may communicate on the access link 612 based on the second beam pair link and second power setting.

At operation 806, the relay device may receive, from the base station, information indicating the first set of resources associated with first control information for the relay device and indicating the second set of resources associated with at least one of data and/or second control information for at least one UE. In the downlink, for example, the information may indicate respective schedules based on which the relay device is to monitor and decode the first and second sets of resources. In the uplink, the information may indicate respective schedules based on which the relay device is to transmit on the first and second sets of resources. Further, the information indicating the first and second sets of resources may indicate whether the first and second sets of resources are overlapping in at least one of time and/or frequency.

In some aspects, the information indicating the first and second sets of resources may be based on the information indicating the capability of the relay device to support communication of first control information and communication of at least one of data and/or second control information on overlapping time resources. For example, if the information indicating the capability of the relay device indicates that the relay device is unable to support simultaneous communication of the first control information and the at least one of data and/or second control information on overlapping time resources, then the first and second sets of resources may not be overlapping in the time domain (but may be overlapping in the frequency domain).

In some other aspects, the information indicating the first and second sets of resources may be based on at least one of the first beamforming configuration, the second beamforming configuration, the first power configuration, and/or the second power configuration. For example, when the first and second beamforming configurations are equivalent (e.g., the same, having the same values, having corresponding fields configured the same, etc.) and the first and second power configurations are equivalent (e.g., the same, having the same values, having corresponding fields configured the same, etc.), the first and second sets of resources may at least partially overlap in time. However, if either the first and second beamforming configurations are different (e.g., having some or all values being unequal, having corresponding fields differently configured, etc.) or the first and second power configurations are different (e.g., having some or all values being unequal, having corresponding fields differently configured, etc.), then the first and second sets of resources may not overlap in time (but may overlap in frequency).

Referring to FIG. 6, for example, the relay device 606 may receive the resource configuration information 626 from the base station 602. The relay device 606 may determine the first and second sets of resources based on the resource configuration information 626. For example, the relay device 606 may determine whether the first and second sets of resources are at least partially overlapping in time and/or in frequency based on the resource configuration information 626.

At operation 808, the relay device may receive, from the base station, information indicating a first priority associated with the first control information and indicating a second priority associated with the at least one of data and/or second control information. The first and second priorities may be different, and the relay device may determine which communications operations/configurations associated with one of the first control information or the at least one of data and/or second control information should be prioritized over other communications operations/configurations associated with the other of the first control information or the at least one of data and/or second control information.

For example, the relay device may determine which beam pair link and/or power setting the relay device is to apply when communicating the first control information and the at least one of data and/or second control information. Illustratively, if the relay device is unable to communicate the first control information and the at least one of data and/or second control information on overlapping time resources but the base station nonetheless configures the first and second sets of resources to be at least partially overlapping in time, then the relay device may determine to apply the beamforming configuration and power configuration associated with communication of the prioritized one of the first control information or the at least one of data and/or second control information while still attempting to communicate the deprioritized one the first control information or the at least one of data and/or second control information.

Referring to FIG. 6, for example, the relay device 606 may receive, from the base station 602, the prioritization information 628. In the downlink, the relay device 606 may determine, based on the prioritization information 628, which beam pair link and/or power setting configuration should be applied by the relay device 606 for receiving the control information 614 and the data/control information 616, e.g., if the relay device 606 is unable to simultaneously receive the control information 614 and the data/control information 616. In the uplink, the prioritization information 628 may indicate which beam pair link and/or power setting configuration should be applied by the relay device 606 for transmitting the control information 644 and the data/control information 646, e.g., if the relay device 606 is unable to simultaneously transmit (e.g., unable to frequency-division multiplex) the control information 644 and the data/control information 646.

At operation 810, the relay device may communicate, with the base station, the first control information on the first set of resources and the at least one of data and/or second control information on the second set of resources. According to one example of downlink communication with the base station, the relay device may receive, from the base station, the first control information on the first set of resources multiplexed with the at least one of data and/or second control information on the second set of resources.

According to one example of uplink communication with the base station, the relay device may multiplex the first control information on the first set of resources with the at least one of data and/or second control information on the second set of resources. The relay device may transmit the multiplexed first control information on the first set of resources and at least one of data and/or second control information on the second set of resources to the base station.

When the first and second sets of resources are configured to at least partially overlap in time, the relay device may multiplex the first control information on the first set of resources and the at least one of data and/or second control information on the second set of resources according to at least one of FDM and/or SDM. However, when the first and second sets of resources are configured to at least partially overlap in frequency, the relay device may multiplex the first control information on the first set of resources and the at least one of data and/or second control information on the second set of resources according to TDM.

The relay device may apply the first beamforming and power configurations when communicating the first control information on the first set of resources, and the relay device may apply the second beamforming and power configurations when communicating the at least one of data and/or second control information on the second set of resources. In some aspects, the first and second beamforming configurations are the same and/or the first and second power configurations may be the same.

In some other aspects, such as when the relay device is unable to communicate the first control information and the at least one of data and/or second control information on overlapping time resources, the relay device may apply the beamforming and power configurations associated with the prioritized one of the first control information or the at least one of data and/or second control information, but may still attempt to communicate the deprioritized one of the first control information or the at least one of data and/or second control information using the applied beamforming and power configurations.

According to one aspect, the first control information may include backhaul DCI for which uplink ACK feedback with the base station is configured. When configured and when DCI is successfully received at least partially on the first set of resources (e.g., over the backhaul link), the relay device may transmit ACK feedback to the base station in order to indicate the successful reception of the DCI. Absent ACK feedback indicating the successful reception of the DCI, the relay device may receive a retransmission of the DCI over the backhaul link at a later time.

Referring to FIG. 6, in one example of downlink communication, the relay device 606 may receive the control information 614 on the first set of resources multiplexed with the data/control information 616 on the second set of resources from the base station 602. The relay device 606 may receive the control information 614 and the data/control information 616 based on at least one of the beam and power configuration information 620 and/or the prioritization information 628.

Still referring to the context of FIG. 6, in one example of uplink communication, the relay device 606 may transmit the control information 644 on the first set of resources and the data/control information 646 on the second set of resources to the base station 602. The relay device 606 may multiplex 648 the control information 644 on the first set of resources and the data/control information 646 on the second set of resources.

At operation 812, the relay device may relay the at least one of data and/or second control information between the base station and the at least one UE. The relay device may be configured to relay the at least one of data and/or second control information as analog signals. For example, the relay device may apply analog signals received at an RX antenna of the relay device from one of the base station or at least one UE to a TX antenna of the relay device for transmission to the other one of the base station or at least one UE. In so doing, the relay device may refrain from decoding and/or other processing that may convert the analog signals to digital signals.

To relay the at least one of data and/or second control information in the downlink, for example, the relay device may transmit the at least one of data and/or second control information to the at least one UE following the communication with (e.g., reception from) the base station of the first control information and the at least one of data and/or second control information. To relay the at least one of data and/or second control information in the uplink, for example, the relay device may receive the at least one of data and/or second control information from the at least one UE prior to the communication with (e.g., transmission to) the base station of the first control information and the at least one of data and/or second control information (e.g., operation 812 may occur prior to operation 810 for uplink communication between the base station and the at least one UE through the relay device).

Referring to FIG. 6, for example, the relay device 606 may relay the data/control information 616 or the data/control information 646 between base station 602 and the UE 604. In the downlink, the relay device 606 may transmit the data/control information 616 received from the base station 602 on the second set of resources to the UE 604. In the uplink, the relay device 606 may transmit the data/control information 646 received from the UE 604 to the base station 602 on the second set of resources, which may be multiplexed with the control information 644 on the first set of resources.

Figure 9:
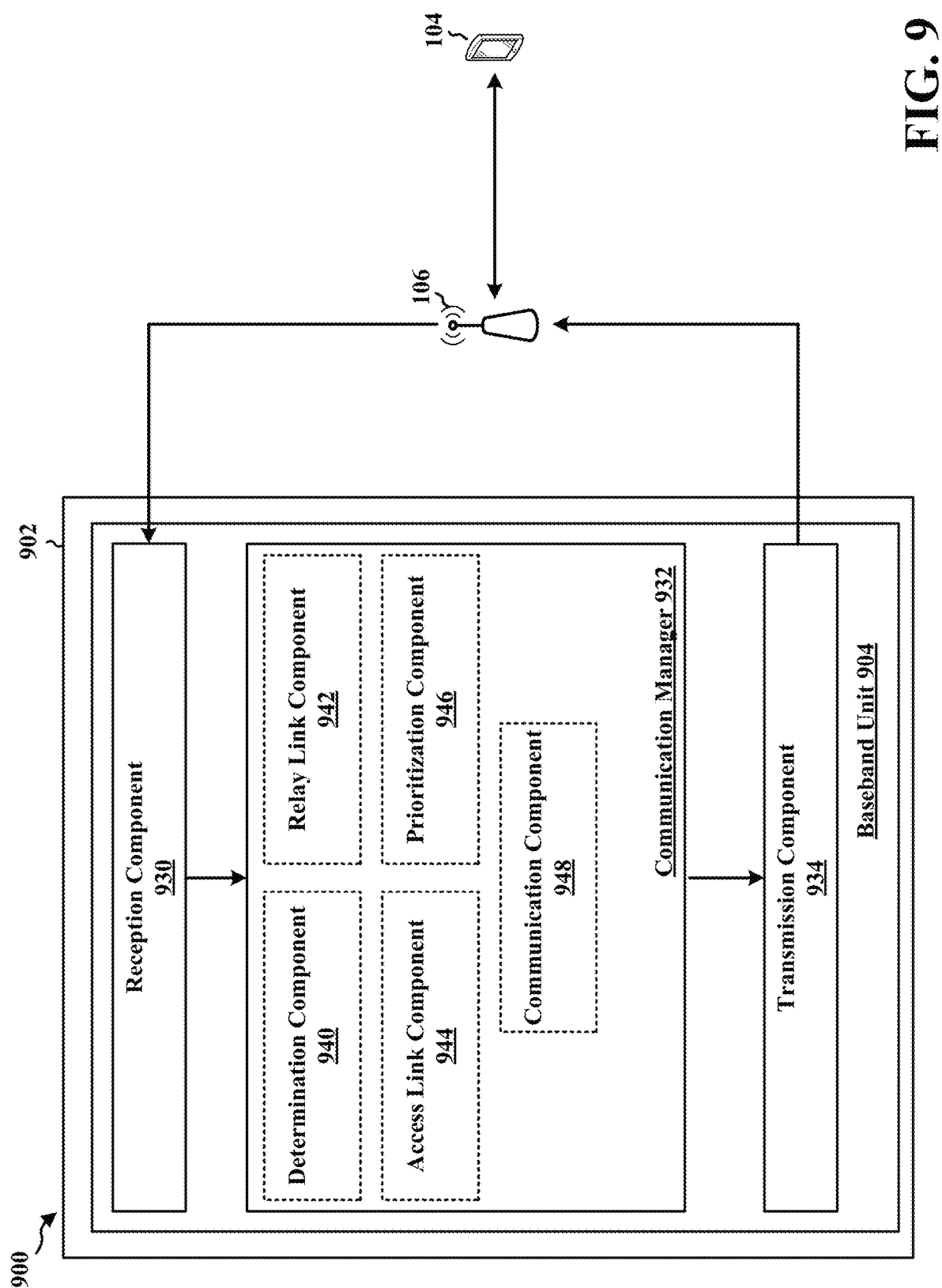
FIG. 9 is a diagram illustrating an example of a hardware implementation for an example apparatus.

FIG. 9 is a diagram 900 illustrating an example of a hardware implementation for an apparatus 902. The apparatus 902 may be a base station, such as a gNB or other macro base station, a small cell base station (e.g., picocell, femto cell, etc.), and so forth. The apparatus 902 includes a baseband unit 904, and the baseband unit 904 may communicate through a cellular RF transceiver with the at least one relay device 106 and the UE 104.

The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software.

The baseband unit 904 further includes a reception component 930, a communication manager 932, and a transmission component 934. The communication manager 932 includes the one or more illustrated components 940, 942, 944, 946, 948. The components 940, 942, 944, 946, 948 within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 includes a determination component 940 that determines whether to configure a first set of resources and a second set of resources to at least partially overlap in at least one of time or frequency, e.g., as described in connection with operation 702 of FIG. 7.

For example, the determination component 940 may determine whether to configure the first set of resources and the second set of resources to at least partially overlap in the at least one of time or frequency based on at least one of a capability of the relay device 106 to support communication of first control information and communication of at least one of data or second control information on overlapping time resources, a first beamforming configuration associated with the first set of resources, a second beamforming configuration associated with the second set of resources, a first power configuration associated with the first set of resources, or a second power configuration associated with the second set of resources.

In one aspect, the determination component 940 may determine to configure the first and second set of resources to at least partially overlap in time when the first beamforming configuration and the second beamforming configuration are equivalent, and when the first power configuration and the second power configuration are equivalent.

In another aspect, the determination component 940 may determine to configure the first and second set of resources to at least partially overlap in time when the first beamforming configuration and the second beamforming configuration are different, or when the first power configuration and the second power configuration are different.

The communication manager 932 further includes a relay link component 942 that configures the first set of resources associated with first control information for the relay device 106, e.g., as described in connection with operation 704 of FIG. 7. For example, the first control information may include backhaul DCI for which ACK feedback with the apparatus 902 is configured.

The communication manager 932 further includes an access link component 944 that configures the second set of resources associated with at least one of data or second control information for at least one UE 104, e.g., as described in connection with operation 706 of FIG. 7. In some aspects, at least one of the relay link component 942 and/or the access link component 944 may configure the second set of resources to at least partially overlap with the first set of resources in at least one of time and/or frequency.

The transmission component 934 transmits information indicating the first set of resources and the second set of resources to the relay device 106, e.g., as described in connection with operation 708 of FIG. 7.

The communication manager 932 further includes a prioritization component 946 that configures a first priority associated with the first control information and configures a second priority associated with the at least one of data and/or second control information. The first priority associated with the first control information and the second priority associated with the at least one of data and/or second control information may be different—e.g., the first priority may be higher than the second priority, or the second priority may be higher than the first priority. The transmission component 934 transmits, to the relay device 106, information indicating the first priority associated with the first control information and the second priority associated with the at least one of data or second control information, e.g., as described in connection with operation 710 of FIG. 7.

The communication manager 932 further includes a communication component 948 that communicates, with the relay device 106, the first control information on the first set of resources and the at least one of data or second control information on the second set of resources, e.g., as described in connection with operation 712 of FIG. 7. The at least one of data and/or second control information may be relayed between the apparatus 902 and the at least one UE 104 by the relay device 106. In some aspects, the first control information on the first set of resources for communication with the relay device 106 is multiplexed with the at least one of data or second control information on the second set of resources for the communication with the at least one UE 104 via the relay device 106.

In the downlink, for example, the communication component 948 may configure the transmission component 934 to transmit the first control information on the first set of resources and the at least one of data and/or second control information on the second set of resources to the relay device 106. The relay device 106 may be configured to forward the at least one of data and/or second control information to the at least one UE 104.

In the uplink, for example, the communication component 948 may configure the reception component 930 to receive the first control information on the first set of resources and the at least one of data and/or second control information on the second set of resources from the relay device 106. The relay device 106 may be configured to forward the at least one of data and/or second control information on the second set of resources to the apparatus 902 from the at least one UE 104.

The apparatus may include additional components that perform each of the blocks of the algorithm in the aforementioned call flow diagram of FIG. 6 and/or the aforementioned flowchart of FIG. 7. As such, each block/operation/communication in the aforementioned call flow diagram of FIG. 6 and/or the aforementioned flowchart of FIG. 7 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for configuring a first set of resources associated with first control information for the relay device; configuring a second set of resources associated with at least one of data or second control information for the at least one UE, and the second set of resources at least partially overlaps with the first set of resources; means for transmitting information indicating the first set of resources and the second set of resources to the relay device; and communicating, with the relay device, the first control information on the first set of resources and the at least one of data or second control information on the second set of resources, the at least one of the data or second control information being further communicated with the at least one UE via the relay device.

In one configuration, the first set of resources and the second set of resources are configured to at least partially overlap in at least one of time or frequency. In one configuration, the apparatus 902, and in particular the baseband unit 904, includes means for determining whether to configure the first set of resources and the second set of resources to at least partially overlap in the at least one of time or frequency based on at least one of a capability of the relay device to support the communication of the first control information and the communication of the at least one of data or second control information on overlapping time resources, a first beamforming configuration associated with the first set of resources, a second beamforming configuration associated with the second set of resources, a first power configuration associated with the first set of resources, or a second power configuration associated with the second set of resources. In one configuration, the first set of resources and the second set of resources are determined to be configured to at least partially overlap in time when the first beamforming configuration and the second beamforming configuration are equivalent and when the first power configuration and the second power configuration are equivalent.

In one configuration, the first set of resources and the second set of resources are determined to be configured to be non-overlapping in time when the first beamforming configuration and the second beamforming configuration are different or when the first power configuration and the second power configuration are different.

In one configuration, the first control information is associated with a first priority that is different from a second priority associated with the at least one of data or second control information. In one configuration, the apparatus 902, and in particular the baseband unit 904, includes means for transmitting, to the relay device, information indicating the first priority associated with the first control information and the second priority associated with the at least one of data or second control information.

In one configuration, the first control information includes backhaul DCI for which uplink ACK feedback with the apparatus 902 is configured. In one configuration, the first control information on the first set of resources is multiplexed with the at least one of data or second control information on the second set of resources for the communicating with the at least one UE via the relay device.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
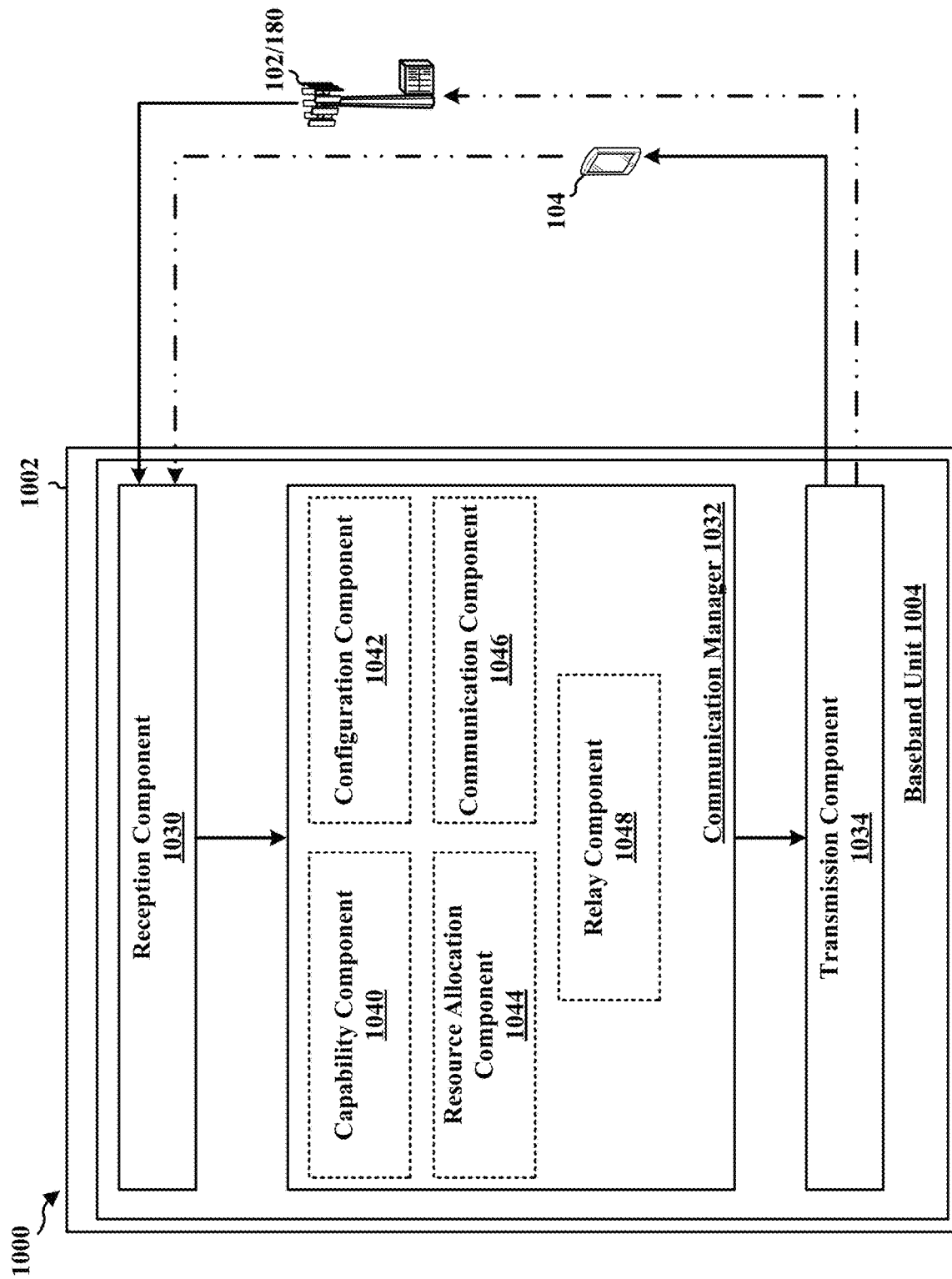
FIG. 10 is a diagram illustrating another example of another hardware implementation for another example apparatus.

FIG. 10 is a diagram 1000 illustrating an example of a hardware implementation for an apparatus 1002. The apparatus 1002 is a base station and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034.

The communication manager 1032 includes the one or more illustrated components 1040, 1042, 1044, 1046, 1048. The components 1040, 1042, 1044, 1046, 1048 within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a capability component 1040 that determines information indicating a capability of the apparatus 1002 to support communication of first control information and communication of at least one of data or second control information on overlapping time resources. The capability component 1040 configures the transmission component 1034 to transmit, to the base station 102/180, information indicating the capability of the apparatus 1002 to support communication of the first control information and communication of the at least one of data or second control information on overlapping time sources, e.g., as described in connection with operation 802 of FIG. 8.

The reception component 1030 receives, from the base station 102/180, information indicating at least one of a first beamforming configuration associated with a first set of resources, a second beamforming configuration associated with a second set of resources, a first power configuration associated with the first set of resources, or a second power configuration associated with the second set of resources, e.g., as described in connection with operation 804 of FIG. 8.

The communication manager 1032 further includes a configuration component 1042 that obtains at least one of the first beamforming configuration associated with the first set of resources, the second beamforming configuration associated with the second set of resources, the first power configuration associated with the first set of resources, or the second power configuration associated with the second set of resources from information provided by the reception component 1030, and the configuration component 1042 may configure the apparatus 1002 according to the at least one of the first beamforming configuration, second beamforming configuration, first power configuration, and/or second power configuration.

The reception component 1030 receives, from the base station 102/180, information indicating the first set of resources associated with first control information for the apparatus 1002 and indicating the second set of resources associated with at least one of data or second control information for at least one UE 104, e.g., as described in connection with operation 806 of FIG. 8. In some aspects, the information indicating the first set of resources associated with the first control information for the apparatus 1002 and indicating the second set of resources associated with the at least one of data or second control information for the at least one UE 104 is based on the capability of the apparatus 1002.

The communication manager 1032 further includes a resource allocation component 1044 that obtains the first set of resources associated with the first control information for the apparatus 1002 and indicating the second set of resources associated with the at least one of data or second control information for the at least one UE 104 from information provided by the reception component 1030, and the resource allocation component 1044 may configure communication by the apparatus 1002 according to the first set of resources associated with the first control information for the apparatus 1002 and the second set of resources associated with the at least one of data or second control information for the at least one UE 104.

In some aspects, the first set of resources and the second set of resources at least partially overlap in at least one of time and/or frequency. In some other aspects, the first set of resources and the second set of resources at least partially overlap in time when the first beamforming configuration and the second beamforming configuration are equivalent and when the first power configuration and the second power configuration are equivalent. In further aspects, the first set of resources and the second set of resources are non-overlapping in time when at least one of the first beamforming configuration and the second beamforming configuration are different or the first power configuration and the second power configuration are different.

The reception component 1030 further receives, from the base station 102/180, information indicating a first priority associated with the first control information and a second priority associated with the at least one of data or second control information, e.g., as described in connection with operation 808 of FIG. 8.

The communication manager 1032 further includes a communication component 1046 that communicates, with the base station 102/180, the first control information on the first set of resources and the at least one of data or second control information on the second set of resources, e.g., as described in connection with operation 810 of FIG. 8. For example, the first control information may include backhaul DCI for which uplink ACK feedback with the base station 102/180 is configured.

In some aspects, the configuration component 1042 may configure the communication component 1046 to communicate the first control information on the first set of resources and the at least one of data or second control information on the second set of resources based on at least one of the first beamforming configuration associated with the first set of resources, the second beamforming configuration associated with the second set of resources, the first power configuration associated with the first set of resources, or the second power configuration associated with the second set of resources.

In one aspect, the communication component 1046 may configure the reception component 1030 to receive the at least one of data or second control information from the at least one UE 104 before being communicated to the base station 102/180, and further configure the transmission component 1034 to transmit the first control information on the first set of resources multiplexes with the at least one of data or second control information on the second set of resources.

The communication manager 1032 further includes a relay component 1048 that relays the at least one of data or second control information between the base station 102/180 and the at least one UE 104, e.g., as described in connection with operation 812 of FIG. 8. For example, the relay component 1048 may be configured to relay the at least one of data or second control information between the base station 102/180 and the at least one UE 104 as analog signals.

In some aspects, the relay component 1048 may configure the reception component 1030 to receive the at least one of data or second control information from the base station 102/180, and may configure the transmission component 1034 to transmit the at least one of data or second control information to the at least one UE 104. In some other aspects, the relay component 1048 may configure the reception component 1030 to receive the at least one of data or second control information from the at least one UE 104, and may configure the transmission component 1034 to transmit the at least one of data or second control information to the base station 102/180.

The apparatus may include additional components that perform each of the blocks of the algorithm in the aforementioned call flow diagram of FIG. 6 and/or the aforementioned flowchart of FIG. 8. As such, each block in the aforementioned call flow diagram of FIG. 6 and/or the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for receiving, from a base station, information indicating a first set of resources associated with first control information for the apparatus 1002 and indicating a second set of resources associated with at least one of data or second control information for at least one UE, and the second set of resources at least partially overlaps with the first set of resources; means for communicating, with the base station, the first control information on the first set of resources and the at least one of data or second control information on the second set of resources; and means for relaying the at least one of data or second control information between the base station and the at least one UE.

In one configuration, the at least one of data or second control information is relayed between the base station and the at least one UE as analog signals. In one configuration, the first set of resources and the second set of resources at least partially overlap in at least one of time or frequency.

In one configuration, the apparatus 1002, and in particular the baseband unit 1004, includes means for transmitting, to the base station, information indicating a capability of the apparatus 1002 to support the communication of the first control information and the communication of the at least one of data or second control information on overlapping time resources, and the information indicating the first set of resources and indicating the second set of resources is based on the capability of the apparatus 1002.

In one configuration, the apparatus 1002, and in particular the baseband unit 1004, includes means for receiving, from the base station, information indicating at least one of a first beamforming configuration associated with the first set of resources, a second beamforming configuration associated with the second set of resources, a first power configuration associated with the first set of resources, or a second power configuration associated with the second set of resources, and the first control information on the first set of resources and the at least one of data or second control information on the second set of resources are communicated with the base station based on the information indicating the at least one of the first beamforming configuration, the second beamforming configuration, the first power configuration, or the second power configuration.

In one configuration, the first set of resources and the second set of resources at least partially overlap in time when the first beamforming configuration and the second beamforming configuration are equivalent and when the first power configuration and the second power configuration are equivalent. In one configuration, the first set of resources and the second set of resources are non-overlapping in time when at least one of the first beamforming configuration and the second beamforming configuration are different or the first power configuration and the second power configuration are different.

In one configuration, the first control information is associated with a first priority that is different from a second priority associated with the at least one of data or second control information, and the first control information on the first set of resources and the at least one of data or second control information on the second set of resources are communicated with the base station based on the first priority and the second priority.

In one configuration, the apparatus 1002, and in particular the baseband unit 1004, includes means for receiving, from the base station, information indicating the first priority associated with the first control information and the second priority associated with the at least one of data or second control information.

In one configuration, the first control information comprises backhaul DCI for which uplink ACK feedback with the base station is configured.

In one configuration, the at least one of data or second control information is received from the at least one UE before being communicated with the base station, and the means for communicating the first control information on the first set of resources and the at least one of data or second control information on the second set of resources is configured to transmit the first control information on the first set of resources multiplexed with the at least one of data or second control information on the second set of resources.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, the method comprising:
   configuring a first set of resources associated with first control information for a relay device;
   configuring a second set of resources associated with at least one of data or second control information for at least one user equipment (UE), wherein the first set of resources and the second set of resources are configured to at least partially overlap in at least one of time or frequency based on at least one of a capability of the relay device to support the communication of the first control information and the communication of the at least one of data or second control information on overlapping time resources, a first beamforming configuration associated with the first set of resources, a second beamforming configuration associated with the second set of resources, a first power configuration associated with the first set of resources, or a second power configuration associated with the second set of resources;
   transmitting information indicating the first set of resources and the second set of resources to the relay device; and
   communicating, with the relay device, the first control information on the first set of resources and the at least one of data or second control information on the second set of resources, the at least one of the data or second control information being further communicated with the at least one UE via the relay device.

2. The method of claim 1, wherein the first set of resources and the second set of resources are determined to be configured to at least partially overlap in time when the first beamforming configuration and the second beamforming configuration are equivalent and when the first power configuration and the second power configuration are equivalent.

3. The method of claim 1, wherein the first set of resources and the second set of resources are determined to be configured to be non-overlapping in time when the first beamforming configuration and the second beamforming configuration are different or when the first power configuration and the second power configuration are different.

4. The method of claim 1, wherein the first control information is associated with a first priority that is different from a second priority associated with the at least one of data or second control information.

5. The method of claim 4, further comprising:
   transmitting, to the relay device, information indicating the first priority associated with the first control information and the second priority associated with the at least one of data or second control information.

6. The method of claim 1, wherein the first control information comprises backhaul downlink control information (DCI) for which uplink acknowledgement (ACK) feedback with the base station is configured.

7. The method of claim 1, wherein the first control information on the first set of resources for communicating with the relay device is multiplexed with the at least one of data or second control information on the second set of resources for communicating with the at least one UE via the relay device.

8. A method of wireless communication by a relay device, the method comprising:
   receiving, from a base station, information indicating a first set of resources associated with first control information for the relay device and indicating a second set of resources associated with at least one of data or second control information for at least one user equipment (UE), wherein the second set of resources at least partially overlaps with the first set of resources;
   communicating, with the base station, the first control information on the first set of resources and the at least one of data or second control information on the second set of resources;
   transmitting, to the base station, information indicating a capability of the relay device to support the communication of the first control information and the communication of the at least one of data or second control information on overlapping time resources; and
   relaying the at least one of data or second control information between the base station and the at least one UE.

9. The method of claim 8, wherein the at least one of data or second control information is relayed between the base station and the at least one UE as analog signals.

10. The method of claim 8, wherein the first set of resources and the second set of resources at least partially overlap in at least one of time or frequency.

11. The method of claim 8, wherein the information indicating the first set of resources and indicating the second set of resources is based on the capability of the relay device.

12. The method of claim 8, further comprising:
   receiving, from the base station, information indicating at least one of a first beamforming configuration associated with the first set of resources, a second beamforming configuration associated with the second set of resources, a first power configuration associated with the first set of resources, or a second power configuration associated with the second set of resources,
   wherein the first control information on the first set of resources and the at least one of data or second control information on the second set of resources are communicated with the base station based on the information indicating the at least one of the first beamforming configuration, the second beamforming configuration, the first power configuration, or the second power configuration.

13. The method of claim 12, wherein the first set of resources and the second set of resources at least partially overlap in time when the first beamforming configuration and the second beamforming configuration are equivalent and when the first power configuration and the second power configuration are equivalent.

14. The method of claim 12, wherein the first set of resources and the second set of resources are non-overlapping in time when at least one of the first beamforming configuration and the second beamforming configuration are different or the first power configuration and the second power configuration are different.

15. The method of claim 8, wherein the first control information is associated with a first priority that is different from a second priority associated with the at least one of data or second control information, and
   wherein the first control information on the first set of resources and the at least one of data or second control information on the second set of resources are communicated with the base station based on the first priority and the second priority.

16. The method of claim 15, further comprising:
   receiving, from the base station, information indicating the first priority associated with the first control information and the second priority associated with the at least one of data or second control information.

17. The method of claim 8, wherein the first control information comprises backhaul downlink control information (DCI) for which uplink acknowledgement (ACK) feedback with the base station is configured.

18. The method of claim 8, wherein the at least one of data or second control information is received from the at least one UE before being communicated with the base station, and wherein the communicating the first control information on the first set of resources and the at least one of data or second control information on the second set of resources comprises:
   transmitting the first control information on the first set of resources multiplexed with the at least one of data or second control information on the second set of resources.

19. An apparatus for wireless communication by a base station, comprising:
   a memory; and
   at least one processor coupled to the memory and configured to:
      configure a first set of resources associated with first control information for a relay device;
      configure a second set of resources associated with at least one of data or second control information for at least one user equipment (UE), wherein first set of resources and the second set of resources are configured to at least partially overlap in at least one of time or frequency based on at least one of a capability of the relay device to support the communication of the first control information and the communication of the at least one of data or second control information on overlapping time resources, a first beamforming configuration associated with the first set of resources, a second beamforming configuration associated with the second set of resources, a first power configuration associated with the first set of resources, or a second power configuration associated with the second set of resources;
      transmit information indicating the first set of resources and the second set of resources to the relay device; and
      communicate, with the relay device, the first control information on the first set of resources and the at least one of data or second control information on the second set of resources, the at least one of the data or second control information being further communicated with the at least one UE via the relay device.

20. The apparatus of claim 19, wherein the first set of resources and the second set of resources are determined to be configured to at least partially overlap in time when a first beamforming configuration associated with the first set of resources and a second beamforming configuration associated with the second set of resources are equivalent and when a first power configuration associated with the first set of resources and a second power configuration associated with the second set of resources are equivalent.

21. The apparatus of claim 19, wherein the first set of resources and the second set of resources are determined to be configured to be non-overlapping in time when a first beamforming configuration associated with the first set of resources and a second beamforming configuration associated with the second set of resources are different or when a first power configuration associated with the first set of resources and a second power configuration associated with the second set of resources are different.

22. The apparatus of claim 19, wherein the first control information on the first set of resources for communication with the relay device is multiplexed with the at least one of data or second control information on the second set of resources for communication with the at least one UE via the relay device.

23. An apparatus for wireless communication by a relay device, comprising:
   a memory; and
   at least one processor coupled to the memory and configured to:
      receive, from a base station, information indicating a first set of resources associated with first control information for the relay device and indicating a second set of resources associated with at least one of data or second control information for at least one user equipment (UE), wherein the second set of resources at least partially overlaps with the first set of resources;
      communicate, with the base station, the first control information on the first set of resources and the at least one of data or second control information on the second set of resources;
      transmit, to the base station, information indicating a capability of the relay device to support the communication of the first control information and the communication of the at least one of data or second control information on overlapping time resources; and
      relay the at least one of data or second control information between the base station and the at least one UE.

24. The apparatus of claim 23, wherein the at least one of data or second control information is relayed between the base station and the at least one UE as analog signals.

25. The apparatus of claim 23, wherein the first set of resources and the second set of resources at least partially overlap in time when a first beamforming configuration associated with the first set of resources and a second beamforming configuration associated with the second set of resources are equivalent and when a first power configuration associated with the first set of resources and a second power configuration associated with the second set of resources are equivalent.

26. The apparatus of claim 23, wherein the first set of resources and the second set of resources are non-overlapping in time when at least one of a first beamforming configuration associated with the first set of resources and a second beamforming configuration associated with the first set of resources and a second power configuration associated with the second set of resources are different.

27. The apparatus of claim 23, wherein the at least one of data or second control information is received from the at least one UE before being communicated with the base station, and wherein the communication of the first control information on the first set of resources and the at least one of data or second control information on the second set of resources comprises to transmit the first control information on the first set of resources multiplexed with the at least one of data or second control information on the second set of resources.

* * * * *